(12) United States Patent
Murakami et al.

(10) Patent No.: US 11,791,751 B2
(45) Date of Patent: Oct. 17, 2023

(54) MOTOR CONTROL SYSTEM, MOTOR CONTROL METHOD, AND PROGRAM

(71) Applicant: Panasonic Intellectual Property Management Co., Ltd., Osaka (JP)

(72) Inventors: Kenta Murakami, Osaka (JP); Hiroshi Fujiwara, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 36 days.

(21) Appl. No.: 17/607,018

(22) PCT Filed: Mar. 13, 2020

(86) PCT No.: PCT/JP2020/011108
§ 371 (c)(1),
(2) Date: Oct. 27, 2021

(87) PCT Pub. No.: WO2020/225978
PCT Pub. Date: Nov. 12, 2020

(65) Prior Publication Data
US 2022/0216813 A1 Jul. 7, 2022

(30) Foreign Application Priority Data

May 9, 2019 (JP) .................. 2019-089265

(51) Int. Cl.
*H02P 5/46* (2006.01)
(52) U.S. Cl.
CPC .................. *H02P 5/46* (2013.01)

(58) Field of Classification Search
CPC ...... H02P 1/54; H02P 1/00; H02P 1/16; H02P 1/24; H02P 1/42; H02P 1/46; H02P 1/56;
(Continued)

(56) References Cited

U.S. PATENT DOCUMENTS

2016/0274563 A1* 9/2016 Eguchi ................ G05B 19/404

FOREIGN PATENT DOCUMENTS

| EP | 599190 A2 | 6/1994 |
| JP | 11-231942 A | 8/1999 |

(Continued)

OTHER PUBLICATIONS

Extended European Search Report dated May 31, 2022 for the related European Patent Application No. 20802843.1.
(Continued)

*Primary Examiner* — Antony M Paul
(74) *Attorney, Agent, or Firm* — McDermott Will & Emery LLP

(57) ABSTRACT

A motor control system includes a control unit and a compensator. The control unit controls an operation of a shaft of a motor in accordance with an operation command for the motor. The compensator calculates compensation information based on an other-shaft information about an operation of another shaft of another motor different from the motor. The compensation information is information for compensating an influence of the operation of the other shaft upon the shaft. The control unit controls the operation of the shaft using the compensation information calculated by the compensator.

16 Claims, 16 Drawing Sheets

(58) Field of Classification Search
CPC ...... H02P 1/58; H02P 3/00; H02P 4/00; H02P 5/00; H02P 6/00; H02P 6/005; H02P 6/006; H02P 6/04; H02P 6/28; H02P 7/00; H02P 7/02; H02P 7/025; H02P 7/29; H02P 21/00; H02P 21/20; H02P 21/22; H02P 21/30; H02P 23/00; H02P 23/16; H02P 25/00; H02P 25/032; H02P 25/034; H02P 27/00; H02P 27/04; H02P 27/06; H02P 6/10; H02P 21/05; H02P 21/0003; H02P 29/00; H02P 2207/05; H02P 6/08; H02P 2205/05; H02P 5/74; H02P 2207/01; H02P 25/022

See application file for complete search history.

(56) References Cited

FOREIGN PATENT DOCUMENTS

| JP | 2003-263228 | | 9/2003 |
|---|---|---|---|
| JP | 2004-070790 | A | 3/2004 |
| JP | 2004-180429 | A | 6/2004 |
| JP | 2008-072829 | | 3/2008 |
| JP | 2017-138821 | | 8/2017 |

OTHER PUBLICATIONS

International Search Report of PCT application No. PCT/JP2020/011108 dated Jun. 9, 2020.
English Translation of Chinese Search Report dated Jun. 12, 2023 for the related Chinese Patent Application No. 202080030010.3.

* cited by examiner

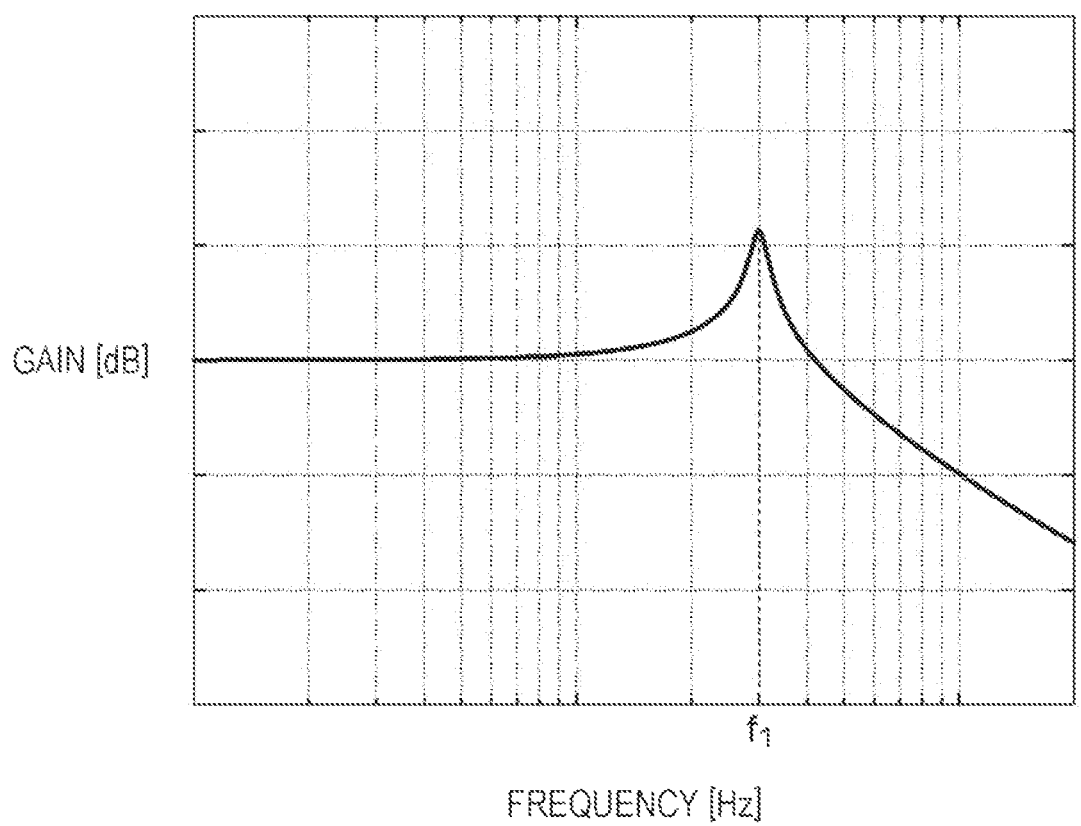

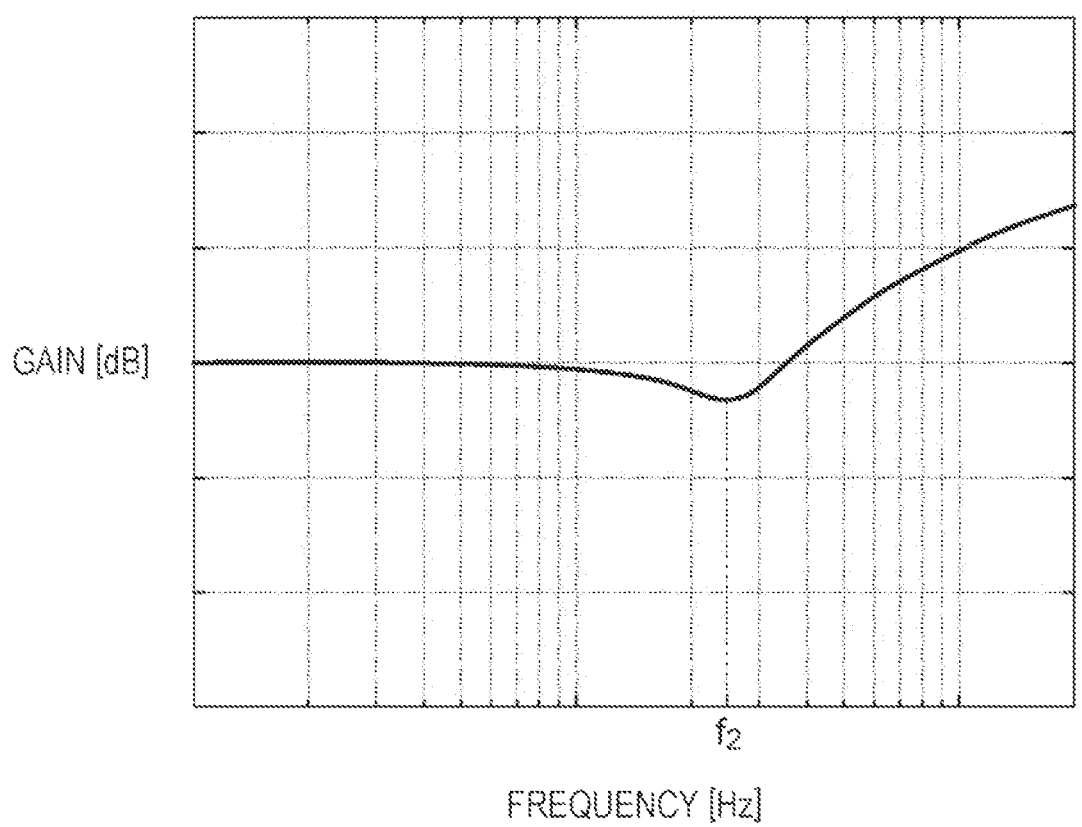

MOTOR CONTROL SYSTEM, MOTOR CONTROL METHOD, AND PROGRAM

TECHNICAL FIELD

The present disclosure relates to a motor control system, a motor control method, and a program. More specifically, the present disclosure relates to the motor control system, the motor control method, and the program for controlling an operation of a shaft of a motor.

BACKGROUND ART

PTL 1 discusses a vibration control device. The vibration control device includes a torque command output unit, a torque command generator, and an addition unit. The torque command output unit outputs a torque command to a mechanical device driven by a motor. The torque command generator generates a compensation torque command associated with a vibration having a phase opposite to that of a vibration generated by driving the mechanical device. The addition unit adds the generated compensation torque command to the torque command.

However, in the vibration control device (motor control system) described in PTL 1, the compensation torque command is generated based on a position command output to an X-axis motor (that is, the motor). Therefore, this vibration control device has a problem such that a vibration associated with an operation of a motor (other motor) different from the X-axis motor is difficult to be reduced.

CITATION LIST

Patent Literature

PTL 1: Unexamined Japanese Patent Publication No. 2017-138821

SUMMARY OF THE INVENTION

The present disclosure has been made in view of the above point, and an object of the present disclosure is to provide a motor control system, a motor control method, and a program that easily reduce a vibration associated with an operation of another motor.

A motor control system according to one aspect of the present disclosure includes a control unit and a compensator. The control unit controls an operation of a shaft of a motor in accordance with an operation command for the motor. The compensator calculates compensation information based on other-shaft information about an operation of another shaft of another motor different from the motor. The compensation information is information for compensating an influence of the operation of the other shaft upon the shaft. The control unit controls the operation of the shaft using the compensation information calculated by the compensator.

A motor control method according to one aspect of the present disclosure includes a control step and a compensation step. The control step is a step of controlling an operation of a shaft of a motor in accordance with an operation command for the motor. The compensation step is a step of calculating compensation information based on other-shaft information about an operation of another shaft of another motor different from the motor. The compensation information is information for compensating an influence of the operation of the other shaft upon the shaft. In the control step, the operation of the shaft is controlled using the compensation information calculated in the compensation step.

A program according to one aspect of the present disclosure causes one or more processors to execute the motor control method described above.

The present disclosure has an advantage such that a vibration associated with the operation of the other motor is easily reduced.

BRIEF DESCRIPTION OF DRAWINGS

FIG. 4 is a diagram illustrating an example of a frequency characteristic of a third transfer function in the motor control system according to the exemplary embodiment of the present disclosure.

FIG. 9 is a diagram illustrating an example of a frequency characteristic of a seventh transfer function in a motor control system according to a second modification of the exemplary embodiment of the present disclosure.

DESCRIPTION OF EMBODIMENT

Exemplary Embodiment (1) Overview

Figure 1:
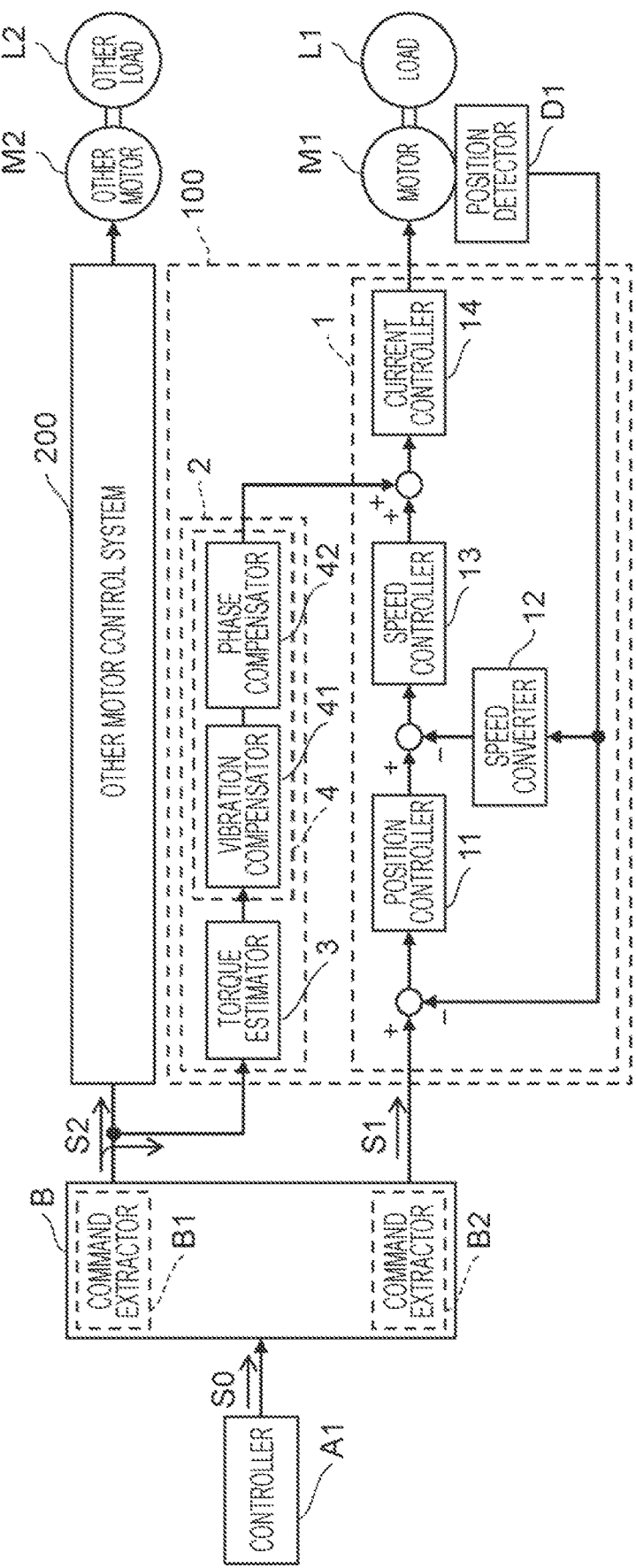
FIG. 1 is a block diagram illustrating an outline of a motor control system according to an exemplary embodiment of the present disclosure.
Figure 2:
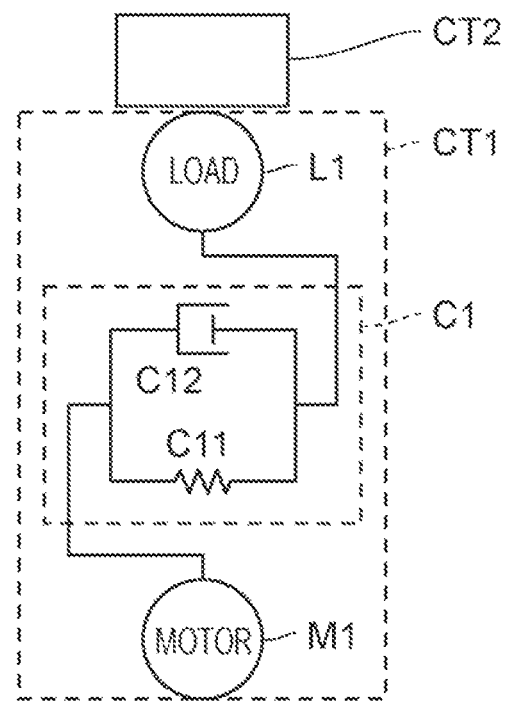
FIG. 2 is a conceptual diagram of a control target of a motor and a control target of another motor in the motor control system according to the exemplary embodiment of the present disclosure.

FIG. 1 is a block diagram illustrating an outline of motor control system 100 according to an exemplary embodiment of the present disclosure. FIG. 2 is a conceptual diagram of a control target of motor M1 and a control target of another motor in motor control system 100 according to the exemplary embodiment of the present disclosure. As illustrated in FIG. 1, motor control system 100 according to the present exemplary embodiment controls an operation of a shaft of motor M1 in accordance with operation command S1 for motor M1. As a result, motor control system 100 controls an operation of load L1 connected to the shaft of motor M1 via connection portion C1 illustrated in FIG. 2. Motor control system 100 is used in, for example, an electronic component mounting machine, a semiconductor manufacturing apparatus, or the like.

Motor control system 100 is used in combination with other motor control system 200 in the above-described apparatuses and the like. Other motor control system 200 controls an operation of another shaft of other motor M2 in accordance with operation command S2 for other motor M2 different from motor M1. This controls the operation of other load L2 connected to the other shaft via a connection portion (not illustrated) with respect to the other shaft. Other load L2 is different from load L1.

Here, as illustrated in FIG. 2, motor M1 and load L1 that are control target CT1 of motor control system 100 illustrated in FIG. 1 can be affected by the operations of other motor M2 and other load L2 that are control target CT2 of other motor control system 200 illustrated in FIG. 1. In FIG. 2, a state in which control target CT2 of other motor control system 200 illustrated in FIG. 1 is in contact with load L1 indicates that a reaction to the operation of control target CT2 of other motor control system 200 illustrated in FIG. 1 is directly transmitted to load L1.

As an example, in a state in which the shaft of motor M1 is stopped and the shaft of other motor M2 is operating, a disturbance torque caused by a reaction to the operation of other motor M2 may act on load L1 and motor M1. In this case, even though the shaft of motor M1 is stopped, the position of the shaft of motor M1 may be displaced due to the disturbance torque. Such a situation may occur, for example, in an electronic component mounting machine when motor control system 100 controls a movement of a head (load L1) along an X-axis direction and other motor control system 200 controls a movement of an arm (other load L2) having the head along a Y-axis direction.

Therefore, motor control system 100 solves the above problem using the following configuration. That is, as illustrated in FIG. 1, motor control system 100 includes control unit 1 and compensator 2.

Control unit 1 controls the operation of the shaft of motor M1 in accordance with operation command S1 for motor M1. Operation command S1 is given from controller A1 corresponding to a host system of motor control system 100 to motor control system 100. Similarly, operation command S2 for other motor M2 is given from controller A1 to other motor control system 200.

Compensator 2 calculates compensation information based on other-shaft information about the operation of the other shaft of other motor M2 different from motor M1. The other-shaft information is, for example, operation command S2 for other motor M2. The compensation information is information for compensating for an influence of the operation of the other shaft upon the shaft of motor M1. As an example, when the disturbance torque caused by a reaction to the operation of the other shaft (that is, other motor M2) acts on load L1 and motor M1, the compensation information is a compensation torque command for offsetting a vibration caused by the disturbance torque. In other words, the compensation torque command is a command for reducing the vibration caused by the disturbance torque acting on at least one of motor M1 and load L1 connected to the shaft of motor M1.

Control unit 1 controls the operation of the shaft of motor M1 using the compensation information calculated by compensator 2. As described above, in the present exemplary embodiment, assuming the influence of the operation of the other shaft of other motor M2 upon the shaft of motor M1, the shaft of motor M1 can be operated to compensate for the influence. Therefore, the present exemplary embodiment has an advantage such that the vibration associated with the operation of other motor M2 is easily reduced.

(2) Details

Hereinafter, motor control system 100 will be described in detail with reference to FIGS. 1 and 2. Hereinafter, as an example, it is assumed that, in the electronic component mounting machine, motor control system 100 controls the movement of the head (load L1) along the X-axis direction, and other motor control system 200 controls the movement of the arm (other load L2) having a head along the Y-axis direction. Note that other motor control system 200 has the same configuration as motor control system 100 except that compensator 2 is not included. Therefore, the description about other motor control system 200 will be appropriately omitted below.

As described above, operation command S1 for motor M1 is given from controller A1 to motor control system 100, and operation command S2 for other motor M2 is given from controller A1 to other motor control system 200. Specifically, controller A1 outputs command signal S0 including operation commands S1, S2 to command extractor B via a wired network or a wireless network. Command extractor B extracts operation commands S1, S2 from received command signal S0, outputs operation command S1 to motor control system 100, and outputs operation command S2 to other motor control system 200.

Command extractor B includes command extractors B1, B2. Command extractor B1 extracts operation command S1 from received command signal S0, and outputs extracted operation command S1 to motor control system 100. Operation command S1 is a position command that instructs a target position of the shaft of motor M1. Command extractor B2 extracts operation command S2 from received command signal S0, and outputs extracted operation command S2 to other motor control system 200. Operation command S2 is a position command that instructs a target position of the other shaft of other motor M2. In the present exemplary embodiment, command extractor B2 outputs extracted operation command S2 not only to other motor control system 200 but also to motor control system 100. Note that command extractor B1 may be configured to extract operation commands S1, S2 from command signal S0 and supply them to motor control system 100.

At least a part of motor control system 100 is a computer system mainly including one or more processors and memories as hardware. In motor control system 100, various functions are achieved by one or more processors executing a program recorded in the memory. The program may be recorded in advance in the memory, may be provided through a telecommunication line, or may be provided in a manner that it is recorded in a non-transitory recording medium such as an optical disk or a hard disk drive readable by a computer system.

Motor control system 100 controls an electric current supplied to motor M1 such that a current position of the shaft detected by position detector D1 provided in motor M1 coincides with a target position of the shaft instructed by operation command S1. Position detector D1 is, for example, a rotary encoder. Similarly, other motor control system 200 controls an electric current supplied to other motor M2 such that a current position of the other shaft detected by the position detector provided in other motor M2 coincides with a target position of the other shaft instructed by operation command S2.

Control unit 1 controls the operation of the shaft of motor M1 in accordance with operation command S1. Control unit 1 includes position controller 11, speed converter 12, speed controller 13, and current controller 14.

A difference between operation command S1 and a detection result of position detector D1 is input to position controller 11. That is, a deviation between the target position of the shaft of motor M1 and the current position of the shaft of motor M1 is input to position controller 11. Position controller 11 outputs a value obtained by performing proportional control calculation on the input deviation as a speed command. The speed command is a command for instructing a target speed of the shaft of motor M1.

Speed converter 12 outputs the detection result of position detector D1, that is, a value calculated based on the current position of the shaft of motor M1 as a shaft speed of the shaft of motor M1.

A difference between the speed command and the shaft speed is input to speed controller 13. That is, the deviation between the target speed of the shaft of motor M1 and the current speed of the shaft of motor M1 is input to speed controller 13. Speed controller 13 outputs a value obtained by performing a proportional integral control calculation on the input deviation, as a torque command. The torque command is a command for instructing a target torque acting on the shaft of motor M1.

A combined torque command that is a sum of the torque command and a compensation torque command (described below) is input to current controller 14. Current controller 14 controls the current supplied to motor M1 such that a torque instructed by the combined torque command is generated on the shaft of motor M1.

Compensator 2 calculates a compensation torque command (compensation information) based on operation command S2 (other-shaft information) for other motor M2 and outputs it. Compensator 2 includes torque estimator 3 and compensation torque calculator 4.

Torque estimator 3 estimates, based on operation command S2 (other-shaft information), a disturbance torque acting on motor M1 associated with the operation of the other shaft of other motor M2. A position command for the other shaft is input as operation command S2 to torque estimator 3. Torque estimator 3 estimates the disturbance torque from the position command for the other shaft using a motion expression of a rotational motion [inertia (inertia moment)×acceleration=torque]. Specifically, torque estimator 3 differentiates the position command for the other shaft twice to convert the position command into an acceleration command of the other shaft. Furthermore, torque estimator 3 multiplies the acceleration command for the other shaft by a total inertia of the other shaft and further executes low-pass filter processing to estimate the disturbance torque.

Here, the disturbance torque caused by the operation of the other shaft acts on the shaft of motor M1 not at the time when operation command S2 is input to other motor control system 200 but after other motor M2 actually operates. Therefore, torque estimator 3 executes the above-described low-pass filter processing in order to prevent the disturbance torque calculated from the position command for the other shaft from deviating in time from the actual operation of other motor M2. This enables the disturbance torque acting on the shaft of motor M1 to be estimated more accurately than a case where the low-pass filter processing is not executed.

Compensation torque calculator 4 calculates a compensation torque command based on the disturbance torque estimated by torque estimator 3, and outputs the compensation torque command as compensation information. Compensation torque calculator 4 includes vibration compensator 41 and phase compensator 42.

Figure 3:
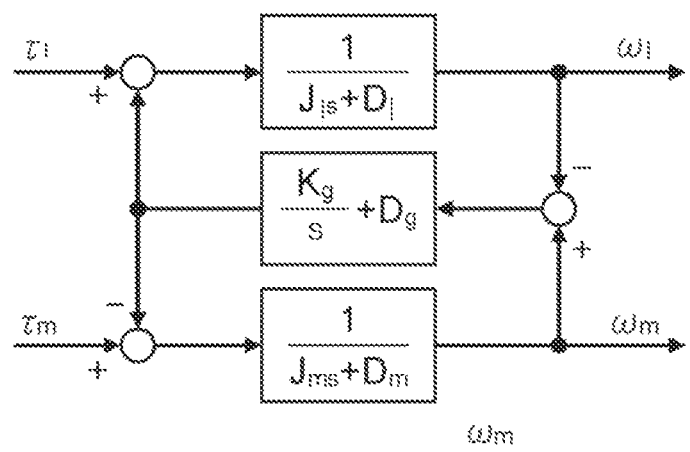
FIG. 3 is a conceptual diagram illustrating an example of a mathematical model of a control system of a motor in the motor control system according to the exemplary embodiment of the present disclosure.

Vibration compensator 41 receives the disturbance torque estimated by torque estimator 3 and performs a calculation based on a mathematical model (see FIG. 3) of control target CT1 illustrated in FIG. 2 to output a temporary compensation torque command. FIG. 3 is a conceptual diagram illustrating an example of a mathematical model of a control system of a motor in the motor control system according to the exemplary embodiment of the present disclosure. The "temporary compensation torque command" in the present disclosure corresponds to a compensation torque command that is calculated before phase compensator 42 executes calculation processing, among the compensation torque commands output from compensation torque calculator 4. If compensation torque calculator 4 does not include phase compensator 42, the temporary compensation torque command is the compensation torque command.

Here, control target CT1 is represented by a two-inertia system model including an inertia of motor M1, spring element C11 and damper element C12 (see FIG. 2) included in connection portion C1 connecting the shaft of motor M1 and load L1, and the inertia of load L1. In FIG. 3, "$J_m$" represents the inertia of motor M1, "$D_m$" represents a viscous friction on a side of motor M1, "$K_g$" represents spring rigidity of connection portion C1, "$D_g$" represents damper viscosity of connection portion C1, "$J_l$" represents the inertia of load L1, and "$D_l$" represents a viscous friction on a side of load L1. In FIG. 3, "$\tau_m$" represents a motor torque acting on motor M1, "$\tau_l$" represents a load torque acting on load L1, "$\omega_m$" represents a shaft speed (motor speed) of the shaft of motor M1, "$\omega_l$" represents a load speed of load L1, and "s" represents a Laplace operator.

In FIG. 3, the disturbance torque caused by reaction to the operation of the other shaft of other motor M2 acts on load L1 as torque "$\tau_l$". The compensation torque acts on motor M1 as torque "$\tau_m$". Therefore, a transfer function in which disturbance torque "$\tau_l$" is an input and compensation torque "$\tau_m$" is an output is derived such that compensation torque "$\tau_m$" offsets the vibration generated in motor M1 by disturbance torque "$\tau_l$" transmitted from the other shaft to load L1.

First transfer function "$G_1(s)$" in which motor torque "$\tau_m$" is an input and motor speed "$\omega_m$" is an output is expressed by following expression (1). Further, second transfer function "$G_2(s)$" in which load torque "$\tau_l$" is an input and motor speed "$\omega_m$" is an output is expressed by following expression (2).

[Expression 1]

$$G_1(s) = \frac{\omega_m}{\tau_m} = \frac{(1 + GL) \cdot M}{1 + GL + GM} \quad (1)$$

$$G_2(s) = \frac{\omega_m}{\tau_l} = \frac{GLM}{1 + GL + GM} \quad (2)$$

$$M = \frac{1}{J_m s + D_m}$$

$$G = \frac{K_g}{s} + D_g$$

$$L = \frac{1}{J_l s + D_l}$$

Then, third transfer function "$G_3(s)$" in which load torque (that is, disturbance torque) "$\tau_l$" is an input and motor torque (that is, compensation torque) "$\tau_m$" is an output in expressions (1), (2) can be derived from following expression (3).

[Expression 2]

$$G_3(s) = \frac{\omega_m}{\tau_l} \cdot \frac{\tau_m}{\omega_m} = \frac{G_2(s)}{G_1(s)} = \frac{D_g s + K_g}{J_l s^2 + (D_g + D_l)s + K_g} \quad (3)$$

FIG. 4 is a diagram illustrating an example of frequency characteristics of third transfer function "$G_3(s)$" in the motor control system according to the exemplary embodiment of the present disclosure. In FIG. 4, a vertical axis represents a gain, and a horizontal axis is a logarithmic axis and represents a frequency. Hereinafter, the same applies to FIG. 7, FIG. 9, and FIG. 11. As illustrated in FIG. 4, third transfer function "$G_3(s)$" is a second-order filter having the peak of a resonance characteristic at "$f_1$" that is an anti-resonance frequency of control target CT1 illustrated in FIG. 2. Resonance frequency "$f_1$" is expressed by following expression (4).

[Expression 3]

$$f_1 = \sqrt{\frac{K_g}{J_l}} \quad (4)$$

As illustrated in FIG. 1, vibration compensator 41 executes filter processing on the disturbance torque estimated by torque estimator 3, using third transfer function "$G_3(s)$" to calculate and output a temporary compensation torque command. That is, compensation torque calculator 4 executes the filter processing on the disturbance torque based on the transfer function (third transfer function "$G_3(s)$") to calculate the compensation torque command (here, the temporary compensation torque command). In the transfer function, the motor torque acting on motor M1 is an input and load torque acting on load L1 is an output.

The filter processing described above is processing based on a product of an inverse function of the transfer function (first transfer function "$G_1(s)$") and the transfer function (second transfer function "$G_2(s)$"). In the first transfer function, the motor torque is an input and the motor speed is an output. In the second transfer function, the load torque is an input and the motor speed is an output.

Phase compensator 42 receives the temporary compensation torque command and performs a phase compensation calculation to output the compensation torque command. As described above, current controller 14 controls the current supplied to motor M1 such that the torque instructed by the torque command is generated in motor M1. However, a delay may be caused by response performance of current controller 14 between the time when the torque command is input and the time when the torque instructed by the torque command is generated in motor M1. Therefore, in a case where the temporary compensation torque command is directly input to current controller 14, a phase difference may be caused between the disturbance torque and the torque instructed by the temporary compensation torque command. Such a phase difference may deteriorate the performance of reducing the vibration caused by the disturbance torque.

Therefore, to reduce the vibration, phase compensator 42 in compensation torque calculator 4 calculates the compensation torque command in consideration of the phase difference. In other words, compensation torque calculator 4 includes phase compensator 42 that compensates the phase difference between the torque instructed by the compensation torque command (here, the temporary compensation torque command) and the disturbance torque.

Phase compensator 42 includes, for example, a first-order filter. In phase compensator 42, a time constant is set for the input temporary compensation torque command such that the phase difference is reduced. Therefore, phase compensator 42 performs a phase compensation calculation on the input temporary compensation torque command to output the compensation torque command in consideration of the phase difference. The combined torque command that is the sum of the compensation torque command and the torque command is input to current controller 14. Current controller 14 controls the current supplied to motor M1 such that the torque instructed by the combined torque command is generated in motor M1. This can reduce the vibration caused by the disturbance torque.

Figure 5A:
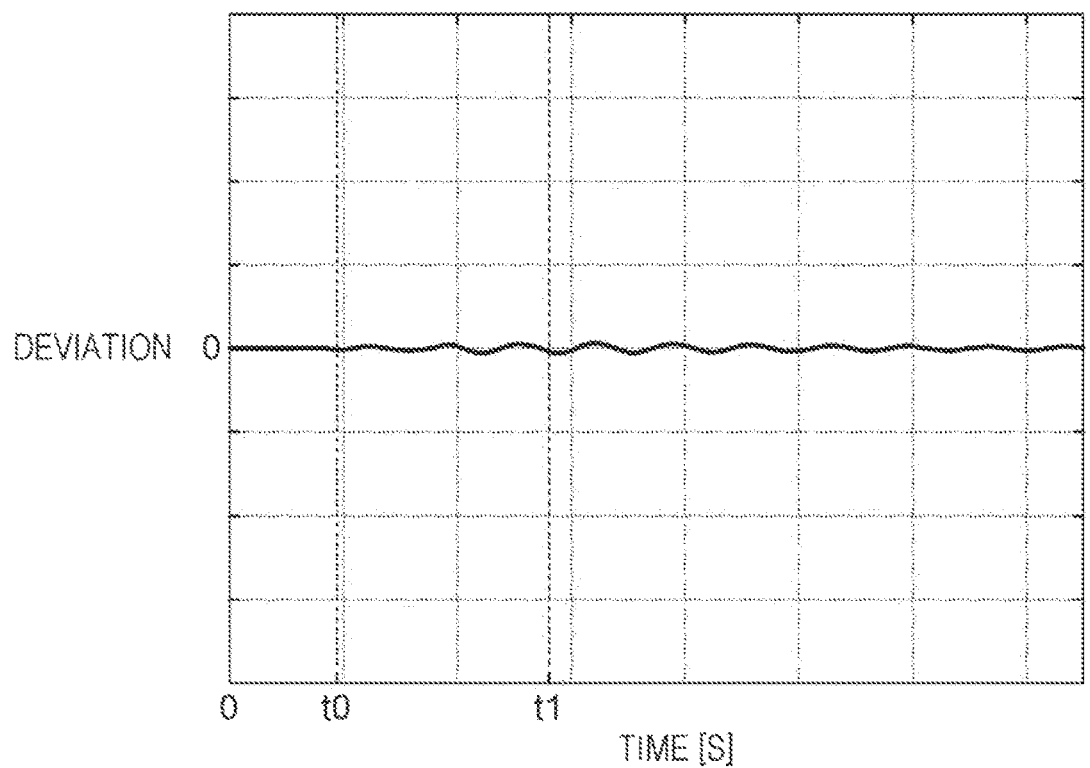
FIG. 5A is a diagram illustrating an example of a simulation result of the motor control system according to the exemplary embodiment of the present disclosure.
Figure 5B:
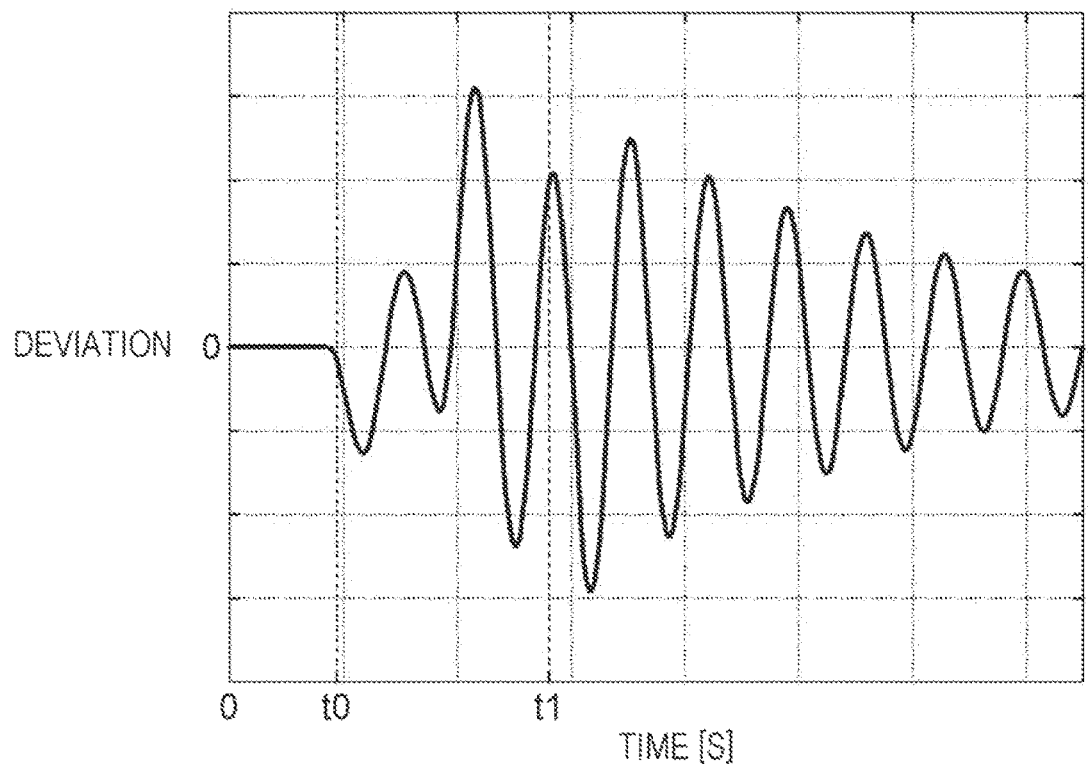
FIG. 5B is a diagram illustrating an example of a simulation result of the motor control system according to the exemplary embodiment of the present disclosure.

FIGS. 5A and 5B illustrate examples of results of simulations for verifications of the effect of reducing the vibration caused by the disturbance torque. FIGS. 5A and 5B are diagrams illustrating the examples of the results of simulations of the motor control system according to the exemplary embodiment of the present disclosure. FIG. 5A illustrates the example of the simulation result in a case where the combined torque command is given to current controller 14 illustrated in FIG. 1 (that is, in a case where the compensation torque command is provided to current controller 14). FIG. 5B illustrates the example of the simulation result in a case where only the torque command is given to current controller 14 illustrated in FIG. 1 (that is, in a case where the compensation torque command is not given to current controller 14). In these simulations, only the other shaft of other motor M2 is intentionally operated by giving operation command S2 to other motor control system 200 with the shaft of motor M1 being stopped.

In each of FIGS. 5A and 5B, a vertical axis represents the deviation between the target position of the shaft of motor M1 and the current position of the shaft of motor M1, and a horizontal axis represents time. In the present exemplary embodiment, since the shaft of motor M1 is stopped, the deviation becomes zero if no disturbance torque acts. Hereinafter, the same applies to FIGS. 8A and 8B, FIGS. 10A and 10B, FIGS. 12A and 12B, and FIGS. 15A and 15B. In each of FIGS. 5A and 5B, operation command S2 is given to other motor control system 200 between time t0 and time t1.

In FIG. 5B, the deviation fluctuates as operation command S2 is given to other motor control system 200 and the other shaft of other motor M2 operates. That is, in FIG. 5B, although the shaft of motor M1 is stopped, the position of the shaft of motor M1 fluctuates due to the disturbance torque acting on motor M1. On the other hand, in FIG. 5A, the fluctuation in the deviation, that is, the fluctuation in the position of the shaft of motor M1 is reduced as compared with FIG. 5B.

In such a manner, in the present exemplary embodiment, the vibration caused by the disturbance torque can be reduced by controlling the operation of the shaft of motor M1 using the compensation information (compensation torque command) calculated by compensator 2. As a result, the deviation between the target position of the shaft of motor M1 and the current position of the shaft of motor M1 can be reduced as compared with a case where compensator 2 is not provided. That is, assuming the influence of the operation of the other shaft of other motor M2 upon the shaft of motor M1, motor control system 100 can operate the shaft of motor M1 such that this influence is compensated. Therefore, the present exemplary embodiment has an advantage such that the vibration caused by the operation of other motor M2 can be easily reduced.

In particular, before the disturbance torque actually acts on motor M1, the disturbance torque is predicted based on operation command S2 given to other motor M2, and the operation of the shaft of motor M1 is controlled such that the vibration cause by the predicted disturbance torque is offset. Therefore, the present exemplary embodiment has an advantage such that the vibration caused by the operation of other motor M2 can be reduced more easily as compared with the case where the vibration is reduced by feedback control after the disturbance torque acts on motor M1.

(3) Operation

Figure 6:
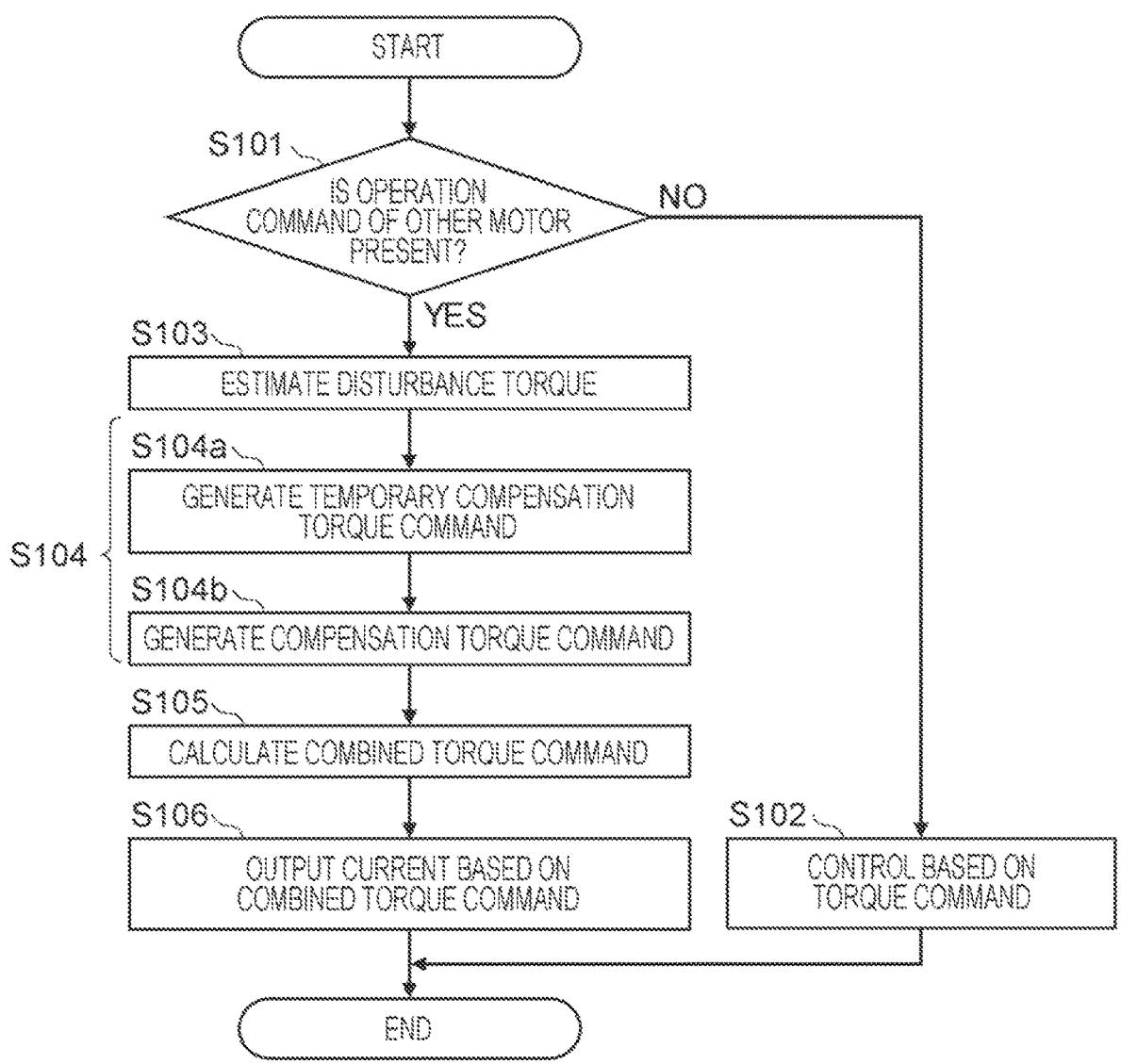
FIG. 6 is a flowchart illustrating an example of an operation of the motor control system according to the exemplary embodiment of the present disclosure.

Hereinafter, an example of the operation of motor control system 100 will be described with reference to FIG. 6. It is assumed that motor control system 100 generates a torque command based on operation command S1 for motor M1.

First, the operation in a case where operation command S2 is not given to other motor M2 (No in step S101) will be described. In this case, since operation command S2 is not input, the compensation torque command is not generated (or the compensation torque command is 0). Therefore, motor M1 is controlled by the torque command generated based on operation command S1 (step S102).

As a result, when the shaft of motor M1 is operating, that is, when operation command S1 is given to motor M1, a current associated with the torque command generated based on operation command S1 is output to motor M1. On the other hand, when the shaft of motor M1 is stopped, that is, when operation command S1 is not given to motor M1, neither the torque command nor the compensation torque command is input (or both values are 0). Therefore, the shaft of motor M1 continues to stop.

Then, when operation command S2 is given to other motor M2 (Yes in step S101), operation command S2 is acquired, and the disturbance torque is estimated based on acquired operation command S2 (step S103). A compensation torque command is then generated based on the estimated disturbance torque (step S104). In step S104, a temporary compensation torque command is first generated based on the estimated disturbance torque (step S104*a*). Thereafter, a compensation torque command is generated based on the temporary compensation torque command (step S104*b*).

A combined torque command that is a sum of the generated torque command and the compensation torque command is calculated (step S105). Thereafter, a current supplied to motor M1 is output based on the calculated combined torque command (step S106).

As a result, when the shaft of motor M1 is operating, that is, when operation command S1 is given to motor M1, motor M1 is controlled based on the combined torque command. On the other hand, when the shaft of motor M1 is stopped, that is, when operation command S1 is not given to motor M1, motor M1 is controlled based on the compensation torque command. When operation command S1 is not given to motor M1, the calculation for calculating the sum of the generated torque command and the compensation torque command may not be performed. In this case, when the current supplied to motor M1 is output (step S106), the current supplied to motor M1 may be output based on the compensation torque command instead of the combined torque command.

As described above, in both the cases where the shaft of motor M1 is operating and is stopped, the operation of the shaft of motor M1 is controlled using the compensation information (compensation torque command). Therefore, in any of the above cases, the vibration caused by the disturbance torque can be reduced.

(4) Modifications

The above-described exemplary embodiment is merely one of various exemplary embodiments of the present disclosure. The above-described exemplary embodiment can be variously changed according to a design and the like as long as the object of the present disclosure can be achieved. A function similar to that of the motor control system may be embodied by a motor control method, a computer program, a non-transitory recording medium recording a computer program, or the like.

A motor control method according to one aspect of the present disclosure includes a control step and a compensation step. The control step is a step of controlling an operation of a shaft of motor M1 in accordance with operation command S1 for motor M1. The compensation step is a step of calculating compensation information based on other-shaft information (here, operation command S2) about an operation of another shaft of other motor M2 different from motor M1. The compensation information is information for compensating for an influence of the operation of the other shaft upon the shaft of motor M1. In the control step, the operation of the shaft of motor M1 is controlled by using the compensation information calculated in the compensation step.

A program according to one aspect of the present disclosure is a program for causing one or more processors to execute the motor control method described above.

Hereinafter, first to seventh modifications of the above-described exemplary embodiment will be described.

(4.1) First Modification

In motor control system 100 of the first modification, viscous friction of damper element C12 illustrated in FIG. 2 is greater than the viscous friction of damper element C12 in the above-described exemplary embodiment. In motor control system 100 of the first modification, calculation processing in vibration compensator 41 is different from the calculation processing in vibration compensator 41 in the exemplary embodiment.

Specifically, instead of the filter processing using third transfer function "$G_3(s)$" described in the exemplary embodiment, vibration compensator 41 of the present modification performs filter processing using a first-order low-pass filter having a cutoff frequency around the peak of a resonance characteristic of third transfer function "$G_3(s)$". In other words, the filter processing executed by compensation torque calculator 4 (here, vibration compensator 41) is processing based on a transfer function of the first-order low-pass filter.

Figure 7:
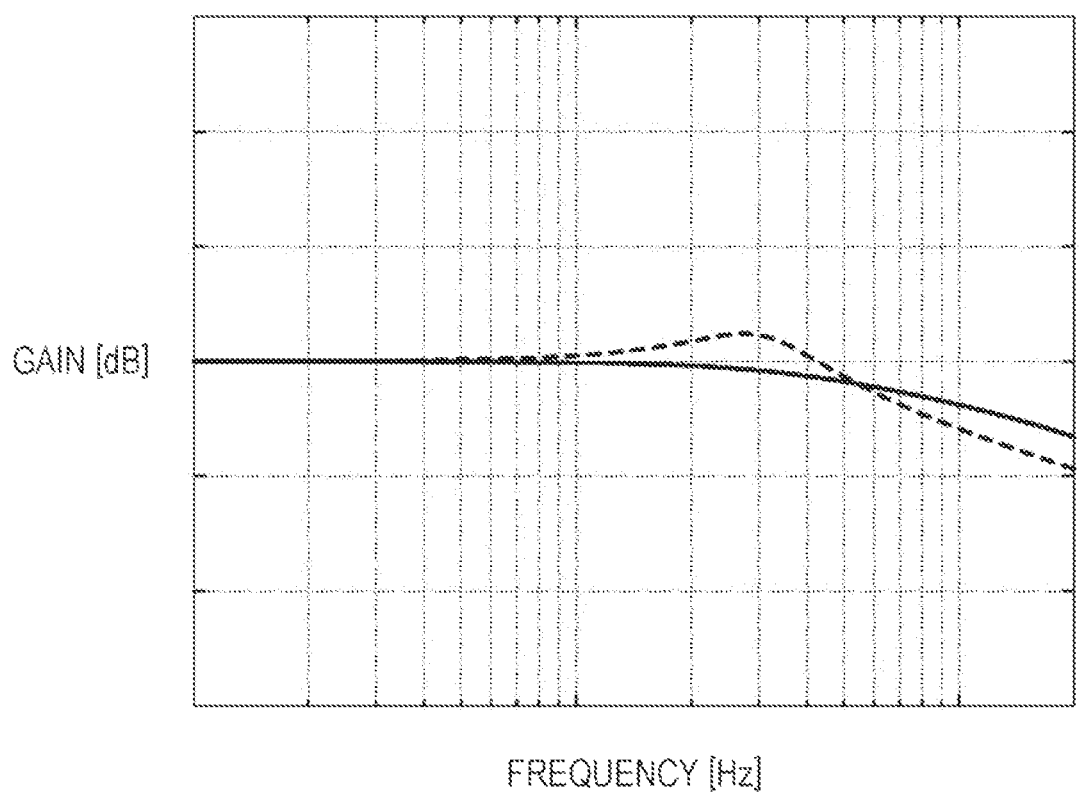
FIG. 7 is a diagram illustrating an example of a frequency characteristic of the third transfer function according to the exemplary embodiment of the present disclosure and an example of a frequency characteristic of a first-order low-pass filter used in a vibration compensator according to a first modification.

FIG. 7 is a diagram illustrating the example of the frequency characteristic of third transfer function "$G_3(s)$" according to the exemplary embodiment of the present disclosure (see a broken line in FIG. 7) and an example of a frequency characteristic of the first-order low-pass filter used in vibration compensator 41 according to the first modification (see a solid line in FIG. 7). In the present modification, since the viscous friction of damper element C12 illustrated in FIG. 2 is greater than that in the exemplary embodiment, damper viscosity "$D_g$" of connection portion C1 is higher than that in the exemplary embodiment. Therefore, in the present modification, in the frequency characteristic of third transfer function "$G_3(s)$", a gain at the peak of the resonance characteristic is smaller than that in the exemplary embodiment. Therefore, in the present modification, the frequency characteristic of third transfer function "$G_3(s)$" approximates the frequency characteristic of the first-order low-pass filter having the cutoff frequency near the peak of the resonance characteristic.

Therefore, in the present modification, vibration compensator 41 performs the filter processing using the first-order low-pass filter as described above to be capable of outputting the compensation torque command (here, the temporary compensation torque command) that can sufficiently offset the vibration caused by the disturbance torque, as in the exemplary embodiment.

Figure 8A:
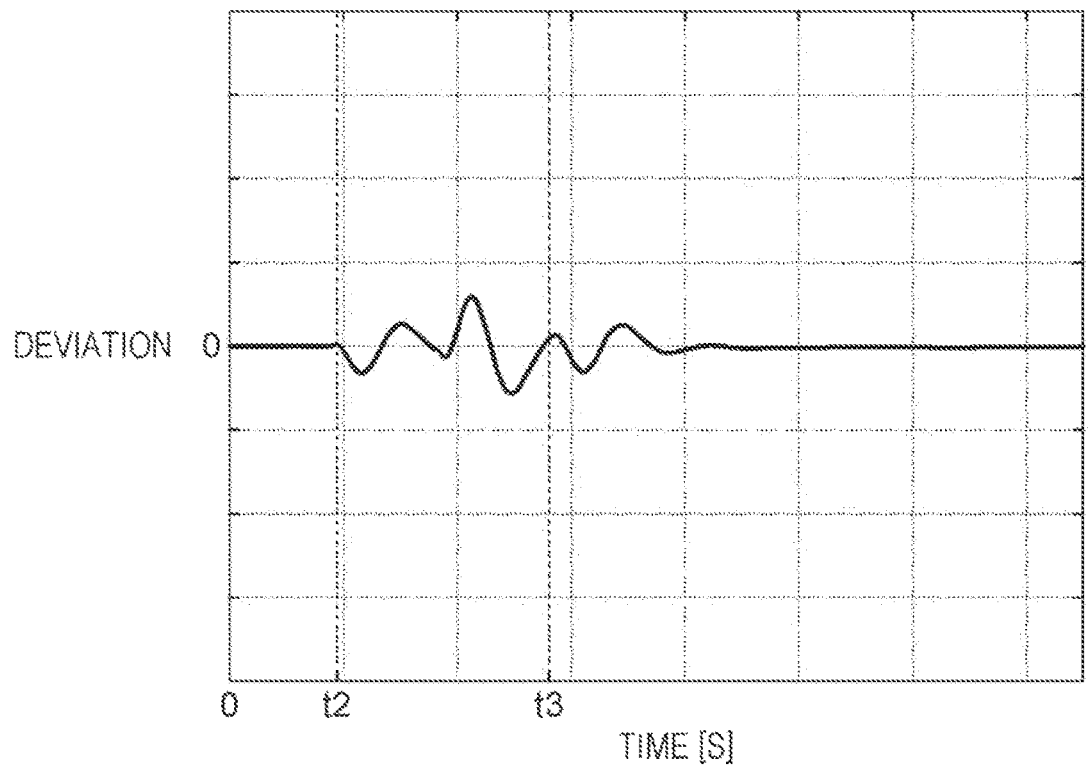
FIG. 8A is a diagram illustrating an example of a simulation result of a motor control system according to the first modification of the exemplary embodiment of the present disclosure.
Figure 8B:
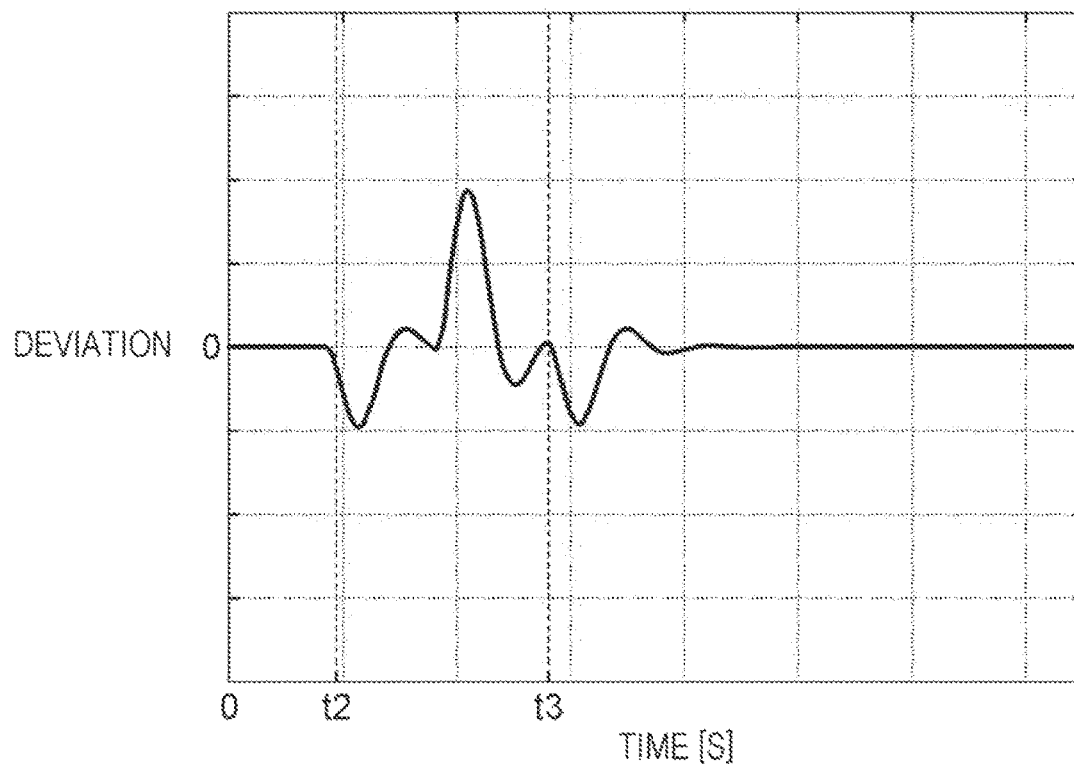
FIG. 8B is a diagram illustrating an example of a simulation result of the motor control system according to the first modification of the exemplary embodiment of the present disclosure.

FIGS. 8A and 8B are diagrams illustrating examples of simulation results of the motor control system according to the first modification of the exemplary embodiment of the present disclosure. FIG. 8A illustrates the example of the simulation result in a case where a combined torque command is given to current controller 14 (that is, a case where the compensation torque command is given to current controller 14). FIG. 8B illustrates the example of the simulation result in a case where only the torque command is given to current controller 14 (that is, a case where the compensation torque command is not given to current controller 14). In these simulations, only the other shaft of other motor M2 is intentionally operated by giving operation command S2 to other motor control system 200 with the shaft of motor M1 being stopped.

In each of FIGS. 8A and 8B, operation command S2 is given to other motor control system 200 between time t2 and time t3. In FIG. 8B, a deviation fluctuates as operation command S2 is given to other motor control system 200 and the other shaft of other motor M2 operates. That is, in FIG. 8B, although the shaft of motor M1 is stopped, the position of the shaft of motor M1 fluctuates due to the disturbance torque acting on motor M1. In FIG. 8A, the fluctuation in the deviation, that is, the fluctuation in the position of the shaft of motor M1 is reduced as compared with FIG. 8B.

In such a manner, in the present modification, the vibration caused by the disturbance torque can be reduced as in the exemplary embodiment. In the present modification, unlike the exemplary embodiment, the order of the filter used in the filter processing in vibration compensator 41 is reduced from second order to first order. Therefore, in the present modification, a calculation load in vibration compensator 41 can be reduced as compared with the exemplary embodiment.

(4.2) Second Modification

In motor control system 100 according to a second modification, a transfer function used in the filter processing of vibration compensator 41 is different from that in the exemplary embodiment. Specifically, in the exemplary embodiment, the transfer function in which disturbance torque "$\tau_l$" is an input and compensation torque "$\tau_m$" is an output is derived such that compensation torque "$\tau_m$" offsets the vibration generated in motor M1 by disturbance torque "$\tau_l$". On the other hand, in the present modification, a transfer function in which disturbance torque "$\tau_l$" is an input and compensation torque "$\tau_m$" is an output is derived such that compensation torque "$\tau_m$" offsets a vibration generated in load L1 by disturbance torque "$\tau l$".

Fourth transfer function "$G_4(s)$" in which motor torque "$\tau_m$" is an input and load speed "$\omega_l$" is an output is expressed by following expression (5). Further, fifth transfer function "$G_5(s)$" in which load torque "$\tau_l$" is an input and load speed "$\omega_l$" is an output is expressed by following expression (6).

[Expression 4]

$$G_4(s) = \frac{\omega_l}{\tau_m} = \frac{1 + GL + GM}{GLM} \quad (5)$$

$$G_5(s) = \frac{\omega_l}{\tau_l} = \frac{L(1 + GM)}{1 + GL + GM} \quad (6)$$

Further, sixth transfer function "$G_6(s)$" in which load torque (that is, disturbance torque) "$\tau_l$" is an input and motor torque (that is, compensation torque) "$\tau_m$" is an output in expressions (5), (6) can be derived from following expression (7).

[Expression 5]

$$G_6(s) = \frac{\omega_l}{\tau_l} \cdot \frac{\tau_m}{\omega_l} = \frac{G_5(s)}{G_4(s)} = \frac{J_m s^2 + (D_m + D_g)s + K_g}{D_g s + K_g} \quad (7)$$

Here, sixth transfer function "$G_6(s)$" is an unstable transfer function in which the order of a numerator is larger than the order of a denominator. Therefore, proper seventh transfer function "$G_7(s)$" expressed by following expression (8) is derived by adding filter processing using a first-order low-pass filter having cutoff frequency "$\omega$" to sixth transfer function "$G_6(s)$". Here, cutoff frequency "$\omega$" is a frequency higher than an anti-resonance frequency in the frequency characteristic of sixth transfer function "$G_6(s)$".

[Expression 6]

$$G_7(s) = G_6(s) \cdot \frac{\omega}{s+\omega} = \frac{J_m s^2 + (D_m + D_g)s + K_g}{D_g s + K_g} \cdot \frac{\omega}{s+\omega} \quad (8)$$

That is, in the present modification, the above-described filter processing is processing based on a product of the transfer function (fifth transfer function "$G_5(s)$"), the transfer function (an inverse function of fourth transfer function "$G_4(s)$"), and the transfer function of the first-order low-pass filter. In the fifth transfer function, the load torque is an input and the load speed is an output. In the fourth transfer function, the motor torque is an input, and the load speed is an output. In the present modification, the cutoff frequency of the first-order low-pass filter is higher than or equal to the anti-resonance frequency of the frequency characteristic of the transfer function in which the load torque is an input and the load speed is an output (sixth transfer function "$G_6(s)$").

FIG. 9 is a diagram illustrating an example of a frequency characteristic of seventh transfer function "$G_7(s)$" in a motor control system according to the second modification of the exemplary embodiment of the present disclosure. As illustrated in FIG. 9, seventh transfer function "$G_7(s)$" is a second-order filter having a peak of a resonance characteristic at anti-resonance frequency "$f_2$" of control target CT1. Anti-resonance frequency "$f_2$" is expressed by following expression (9).

[Expression 7]

$$f_2 = \sqrt{\frac{K_g}{J_m}} \quad (9)$$

Vibration compensator 41 executes filter processing using seventh transfer function "$G_7(s)$" on the disturbance torque estimated by torque estimator 3 to output a compensation torque command (here, temporary compensation torque command).

Figure 10A:
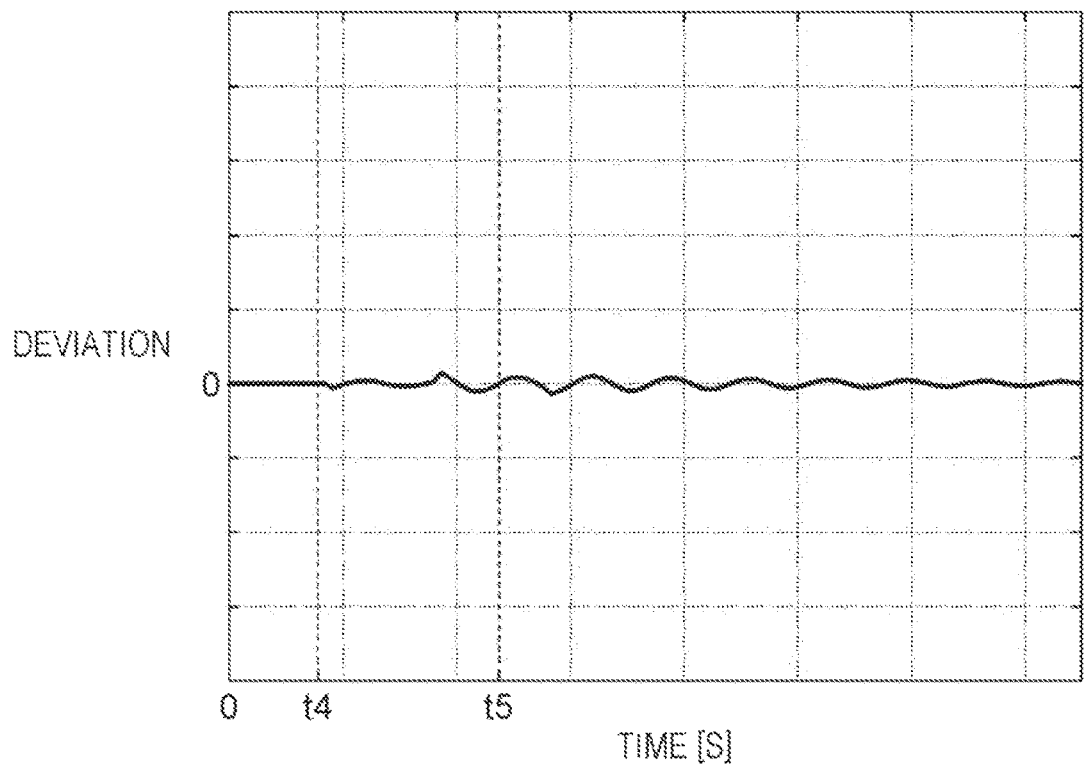
FIG. 10A is a diagram illustrating an example of a simulation result of the motor control system according to the second modification of the exemplary embodiment of the present disclosure.
Figure 10B:
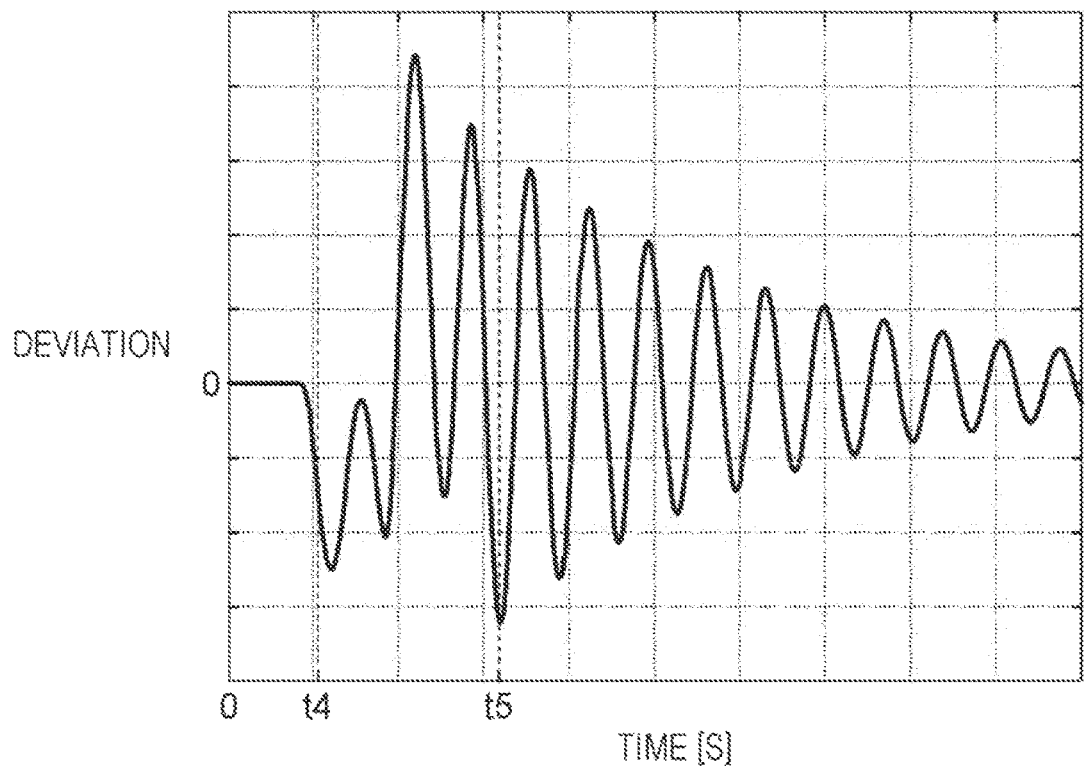
FIG. 10B is a diagram illustrating an example of a simulation result of the motor control system according to the second modification of the exemplary embodiment of the present disclosure.

FIGS. 10A and 10B are diagrams illustrating examples of results of simulations for verifications in the motor control system according to the second modification of the exemplary embodiment of the present disclosure. FIG. 10A illustrates the example of the simulation result in a case where a combined torque command is given to current controller 14 (that is, in a case where the compensation torque command is given to current controller 14). FIG. 10B illustrates the example of the simulation result in a case where only the torque command is given to current controller 14 (that is, in a case where the compensation torque command is not given to current controller 14). In these simulations, only the other shaft of other motor M2 is intentionally operated by giving operation command S2 to other motor control system 200 with the shaft of motor M1 being stopped.

In each of FIGS. 10A and 10B, operation command S2 is given to other motor control system 200 between time t4 and time t5. In FIG. 10B, a deviation fluctuates as operation command S2 is given to other motor control system 200 and the other shaft of other motor M2 operates. That is, in FIG. 10B, although the shaft of motor M1 is stopped, the position of the shaft of motor M1 fluctuates due to the disturbance torque acting on motor M1. On the other hand, in FIG. 10A, the fluctuation in the deviation, that is, the fluctuation in the position of the shaft of motor M1 is reduced as compared with FIG. 10B.

In such a manner, in the present modification, the vibration caused by the disturbance torque can be reduced as in the exemplary embodiment.

(4.3) Third Modification

In motor control system 100 according to a third modification, viscous friction of damper element C12 is greater than the viscous friction of damper element C12 in the second modification. In motor control system 100 according to the third modification, calculation processing in vibration compensator 41 is different from the calculation processing in vibration compensator 41 in the second modification.

Specifically, in the present modification, vibration compensator 41 executes filter processing using a first-order high-pass filter having a cutoff frequency near the peak of a resonance characteristic of seventh transfer function "$G_7(s)$" instead of the filter processing using seventh transfer function "$G_7(s)$" in the second modification. In other words, the filter processing executed by compensation torque calculator 4 (here, vibration compensator 41) is processing based on a transfer function of the first-order high-pass filter.

Figure 11:
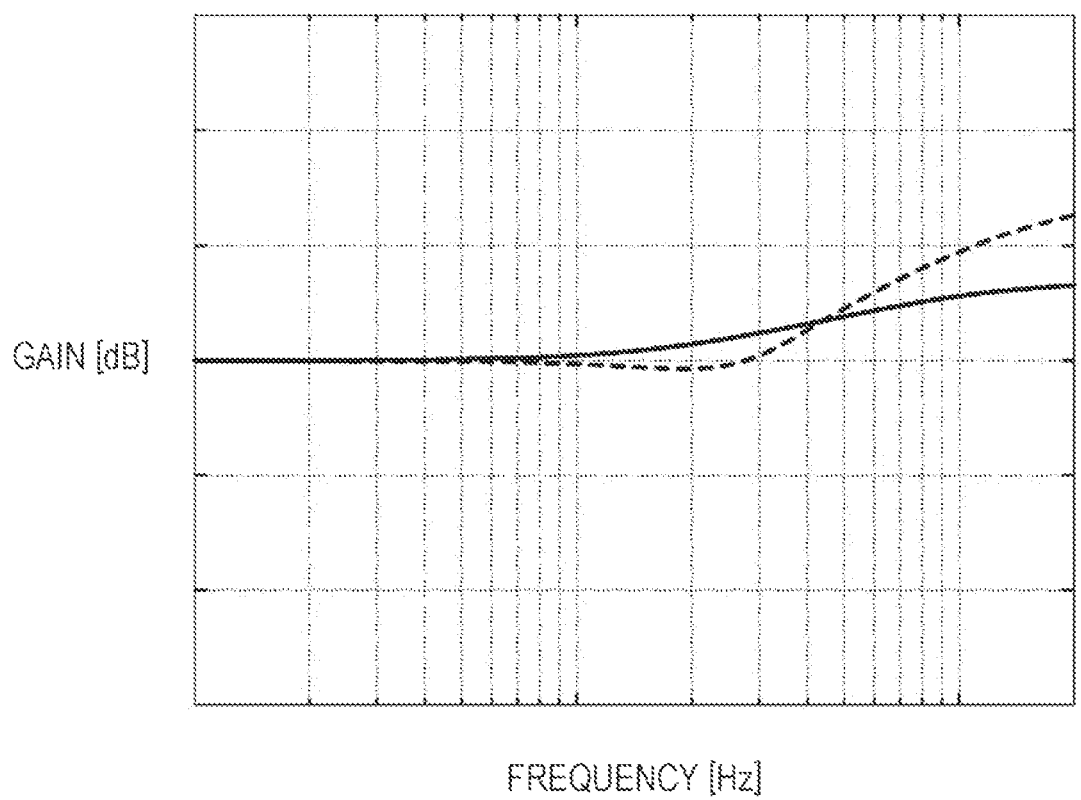
FIG. 11 is a diagram illustrating an example of a frequency characteristic of a first-order high-pass filter in a motor control system according to a third modification of the exemplary embodiment of the present disclosure.

FIG. 11 is a diagram illustrating an example of a frequency characteristic of the first-order high-pass filter in a motor control system according to the third modification of the exemplary embodiment of the present disclosure. In FIG. 11, a broken line indicates the example of the frequency characteristic of seventh transfer function "$G_7(s)$" described in the second modification. A solid line indicates an example of a frequency characteristic of the first-order high-pass filter used in vibration compensator 41 according to the present modification. In the present modification, since viscous friction of damper element C12 is greater than that in the second modification, damper viscosity "$D_g$" of connection portion C1 is higher than that in the second modification. Therefore, in the present modification, in the frequency characteristic of seventh transfer function "$G_7(s)$", a gain at the peak of the resonance characteristic is greater than that in the second modification. Therefore, in the present modification, the frequency characteristic of seventh transfer function "$G_7(s)$" is similar to the frequency characteristic of the first-order high-pass filter having the cutoff frequency near the peak of the resonance characteristic.

Therefore, in the present modification, vibration compensator 41 executes the filter processing using the first-order high-pass filter as described above to be capable of outputting a compensation torque command (here, a temporary compensation torque command) that can sufficiently offset the vibration caused by the disturbance torque, as in the second modification.

Figure 12A:
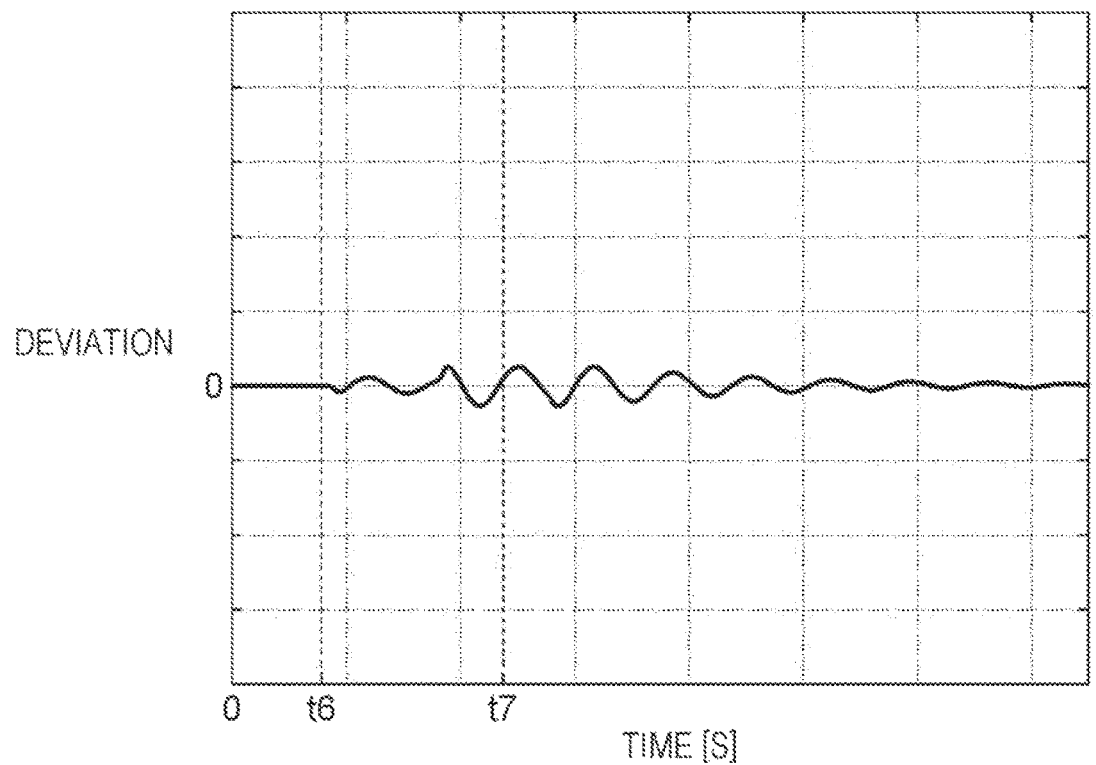
FIG. 12A is a diagram illustrating an example of a simulation result of the motor control system according to the third modification of the exemplary embodiment of the present disclosure.
Figure 12B:
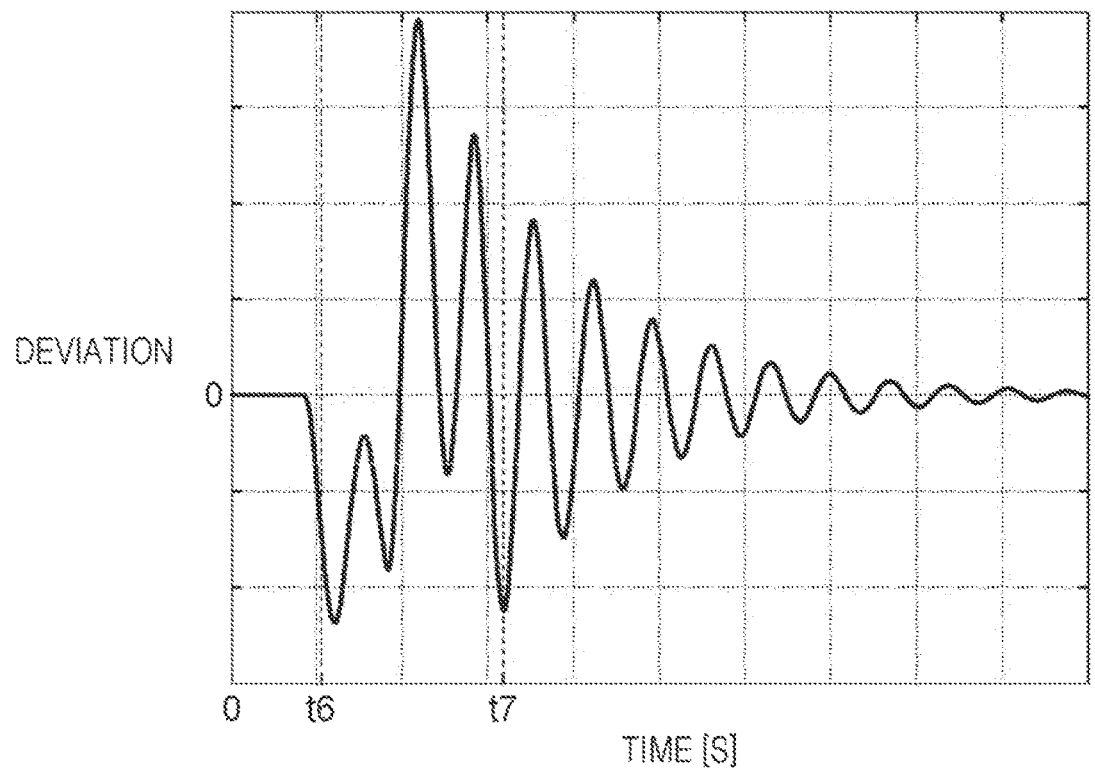
FIG. 12B is a diagram illustrating an example of a simulation result of the motor control system according to the third modification of the exemplary embodiment of the present disclosure.

FIGS. 12A and 12B are diagrams illustrating examples of simulation results of the motor control system according to the third modification of the exemplary embodiment of the present disclosure. FIG. 12A illustrates the example of the simulation result in a case where a combined torque command is given to current controller 14 (that is, in a case where the compensation torque command is given to current controller 14). FIG. 12B illustrates the example of the simulation result in a case where only the torque command is given to current controller 14 (that is, in a case where the compensation torque command is not given to current controller 14). In these simulations, only another shaft of other motor M2 is intentionally operated by giving operation command S2 to other motor control system 200 with the shaft of motor M1 being stopped.

In each of FIGS. 12A and 12B, operation command S2 is given to other motor control system 200 between time t6 and time t7. In FIG. 12B, a deviation fluctuates as operation command S2 is given to other motor control system 200 and the other shaft of other motor M2 operates. That is, in FIG. 12B, although the shaft of motor M1 is stopped, the position of the shaft of motor M1 fluctuates due to the disturbance torque acting on motor M1. In FIG. 12A, the fluctuation in the deviation, that is, the fluctuation in the position of the shaft of motor M1 is reduced as compared with FIG. 12B.

In such a manner, in the present modification, as in the second modification, the vibration caused by the disturbance torque can be reduced. In the present modification, unlike the second modification, the order of the filter used in the filter processing in vibration compensator 41 is reduced from second order to first order. Therefore, in the present modification, a calculation load in vibration compensator 41 can be reduced as compared with the second modification.

(4.4) Fourth Modification

Figure 13:
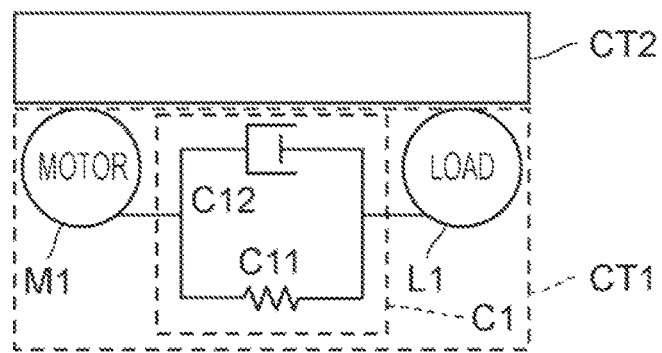
FIG. 13 is a conceptual diagram of a control target of a motor and a control target of another motor in a motor control system according to a fourth modification of the exemplary embodiment of the present disclosure.

FIG. 13 is a conceptual diagram of a control target of a motor and a control target of another motor in a motor control system according to a fourth modification of the exemplary embodiment of the present disclosure. As illustrated in FIG. 13, motor control system 100 according to the fourth modification is different from the exemplary embodiment in that control target CT2 (other motor M2 and other load L2) of other motor control system 200 is installed at a position that can directly affect both motor M1 and load L1. In FIG. 13, a state in which control target CT2 of other motor control system 200 is in contact with both motor M1 and load L1 indicates that a reaction to the operation of control target CT2 of other motor control system 200 is directly transmitted to both motor M1 and load L1.

That is, in the exemplary embodiment, the reaction to the operation of control target CT2 is directly transmitted to load L1, and is indirectly transmitted to motor M1 via connection portion C1. On the contrary, in the present modification, the reaction to the operation of control target CT2 is directly transmitted to both motor M1 and load L1.

In the present modification, when a shaft of other motor M2 operates, a disturbance torque caused by the reaction to the operation of other motor M2 directly acts on both motor M1 and load L1. Here, since the inertia is different between motor M1 and load L1, even when the same disturbance torque acts, a misalignment occurs therebetween. When the misalignment occurs therebetween, a vibration occurs due to elasticity of spring element C11, and both motor M1 and load L1 may vibrate. On the other hand, since the disturbance torque directly acting on motor M1 is transmitted to motor M1 bypassing spring element C11, the vibration caused by the disturbance torque does not occur in motor M1, and instead, an impulse type deviation may occur.

Figure 14:
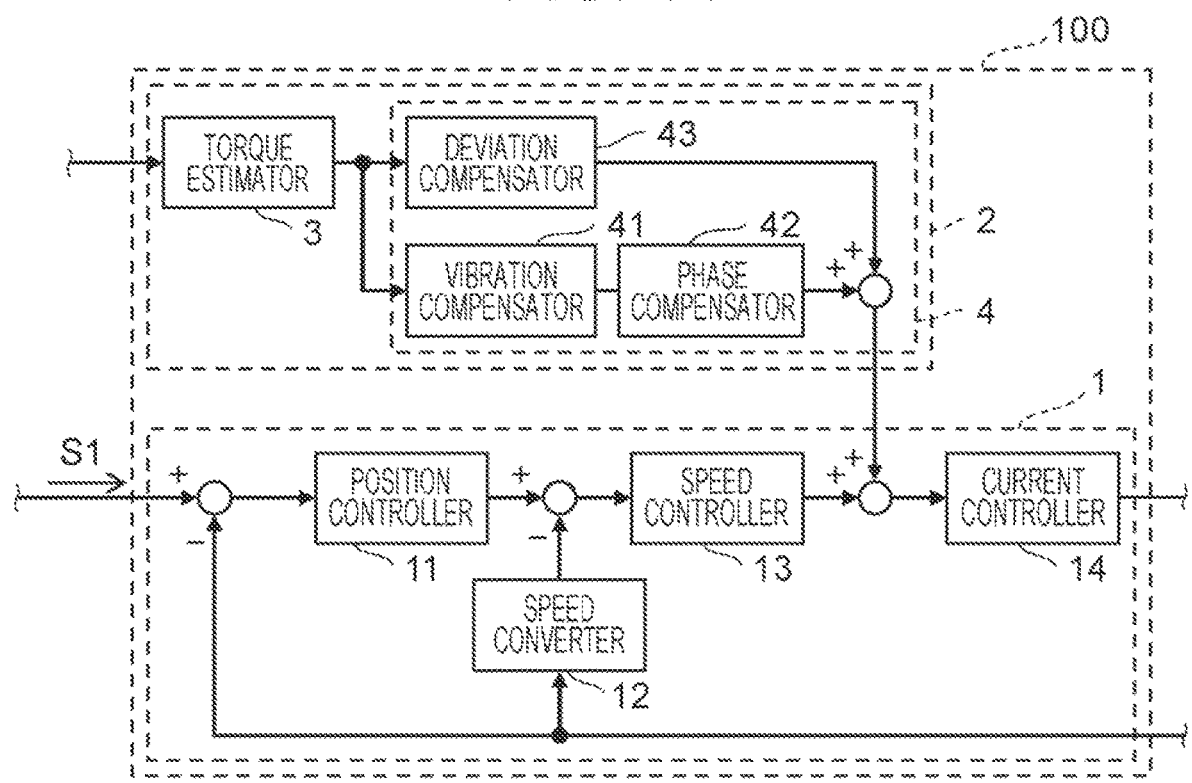
FIG. 14 is a block diagram illustrating an outline of a main part of the motor control system according to the fourth modification of the exemplary embodiment of the present disclosure.

FIG. 14 is a block diagram illustrating an outline of a main part of the motor control system according to the fourth modification of the exemplary embodiment of the present disclosure. As illustrated in FIG. 14, in the present modification, unlike the exemplary embodiment, compensator 2 further includes deviation compensator 43 in order to reduce the above-described impulse type deviation. Deviation compensator 43 compensates, based on the disturbance torque estimated by torque estimator 3, the deviation generated in motor M1 when the disturbance torque acts on motor M1, bypassing load L1. Specifically, deviation compensator 43 uses the disturbance torque estimated by torque estimator 3 as an input and executes calculation processing for multiplying the disturbance torque by a coefficient. As a result, deviation compensator 43 outputs a deviation compensation torque command. Therefore, in the present modification, compensator 2 outputs, to control unit 1, a compensation torque command that is a sum of a compensation torque command output from phase compensator 42 and the deviation compensation torque command output from deviation compensator 43.

Figure 15A:
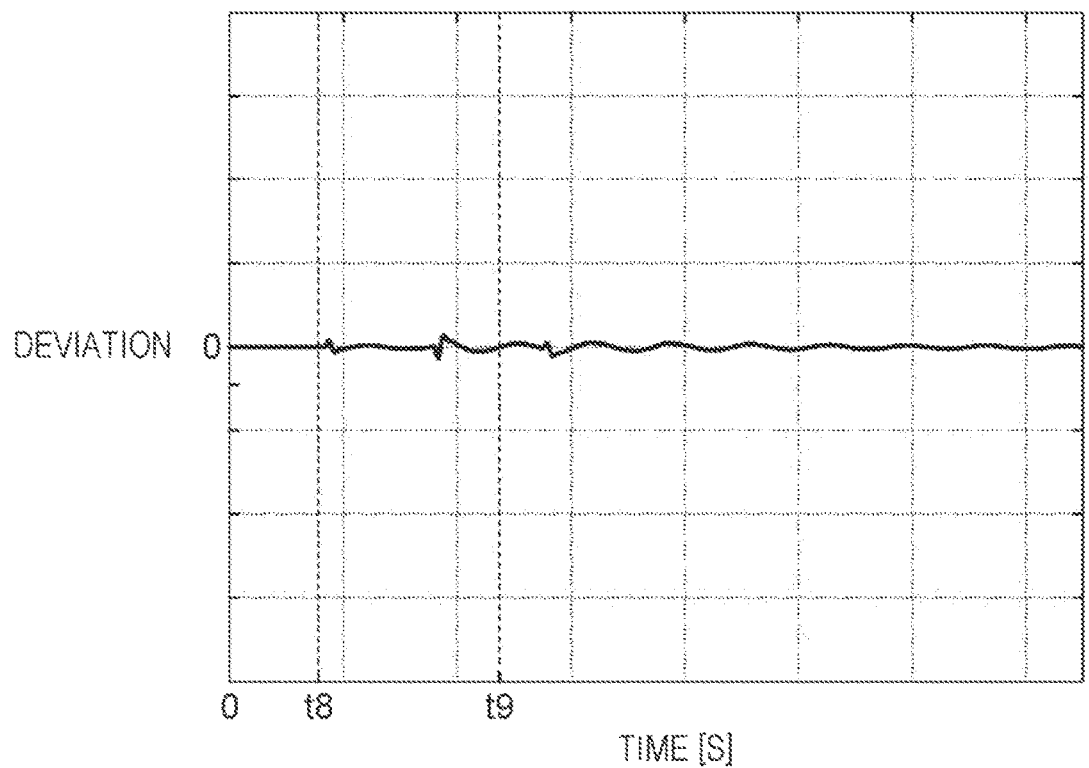
FIG. 15A is a diagram illustrating an example of a simulation result of the motor control system according to the fourth modification of the exemplary embodiment of the present disclosure.
Figure 15B:
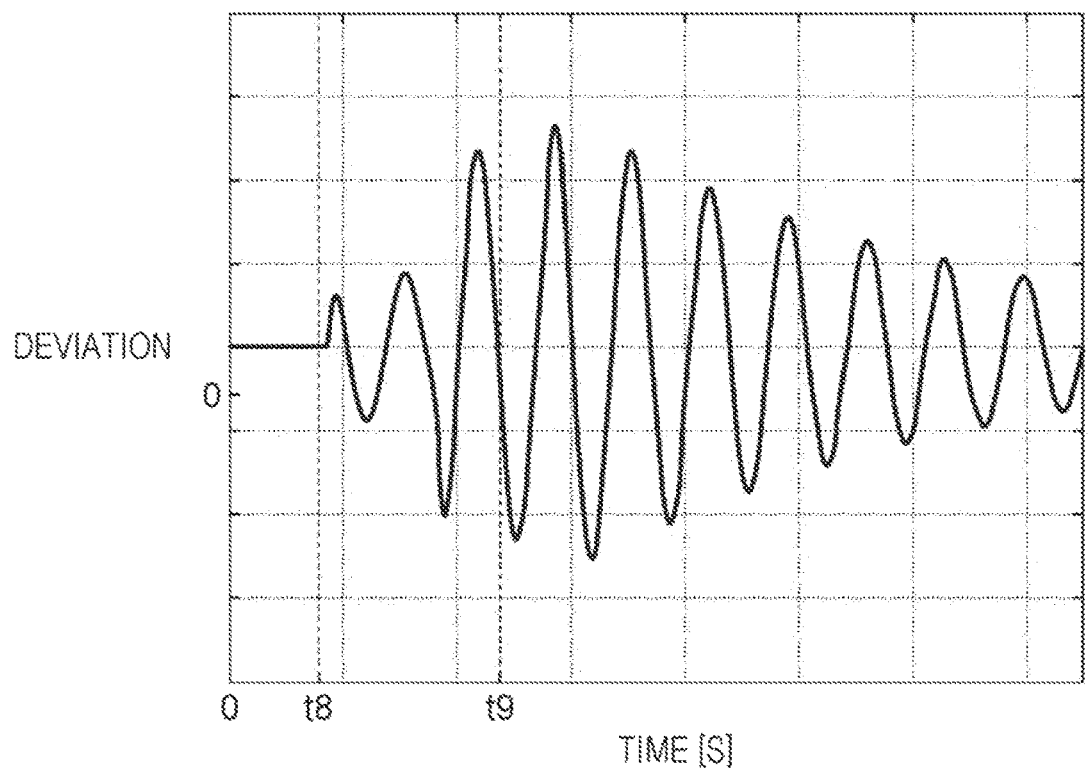
FIG. 15B is a diagram illustrating an example of a simulation result of the motor control system according to the fourth modification of the exemplary embodiment of the present disclosure.

FIGS. 15A and 15B are diagrams illustrating examples of simulation results of the motor control system according to the fourth modification of the exemplary embodiment of the present disclosure. FIG. 15A illustrates the example of the simulation result in a case where a combined torque command is given to current controller 14 (that is, in a case where the compensation torque command is given to current controller 14). FIG. 15B illustrates the example of the simulation result in a case where only the torque command is given to current controller 14 (that is, in a case where the compensation torque command is not given to current controller 14). In these simulations, only the other shaft of other motor M2 is intentionally operated by giving operation command S2 to other motor control system 200 with the shaft of motor M1 being stopped.

In each of FIGS. 15A and 15B, operation command S2 is given to other motor control system 200 between time t8 and time t9. In FIG. 15B, the deviation fluctuates as operation command S2 is given to other motor control system 200 and the other shaft of other motor M2 operates. That is, in FIG. 15B, although the shaft of motor M1 is stopped, the position of the shaft of motor M1 fluctuates due to the disturbance torque acting on motor M1. On the other hand, in FIG. 15A, the fluctuation in the deviation, that is, the fluctuation in the position of the shaft of motor M1 is reduced as compared with FIG. 15B.

In such a manner, in the present modification, the vibration caused by the disturbance torque can be reduced as in the exemplary embodiment. In the present modification, it is possible to further reduce an impulse type deviation caused by the disturbance torque directly acting on motor M1.

(4.5) Fifth Modification

Figure 16:
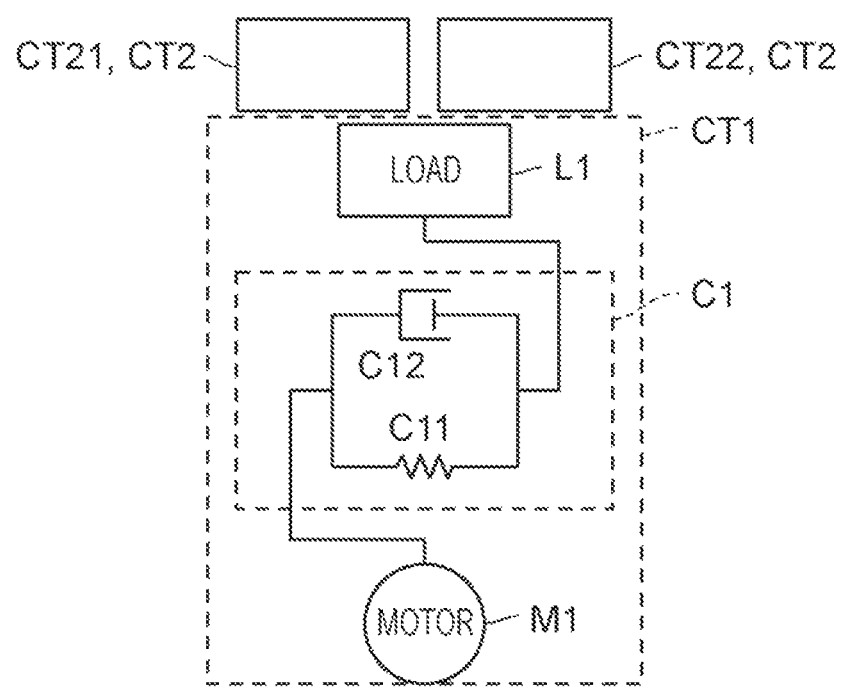
FIG. 16 is a conceptual diagram of a control target of a motor and control targets of a plurality of other motors in a motor control system according to a fifth modification of the exemplary embodiment of the present disclosure.

FIG. 16 is a conceptual diagram of a control target of a motor and control targets of a plurality of other motors in motor control system 100 according to a fifth modification of the exemplary embodiment of the present disclosure. As illustrated in FIG. 16, motor control system 100 according to the fifth modification is different from that in the above exemplary embodiment in that motor M1 and load L1 may be affected by operations of control targets CT21, CT22 of the plurality of (here, two) other motor control systems 200 (see FIG. 17). In FIG. 16, a state in which control targets CT21, CT22 are in contact with load L1 indicates that reactions to the operations of control targets CT21, CT22 are directly transmitted to load L1.

Figure 17:
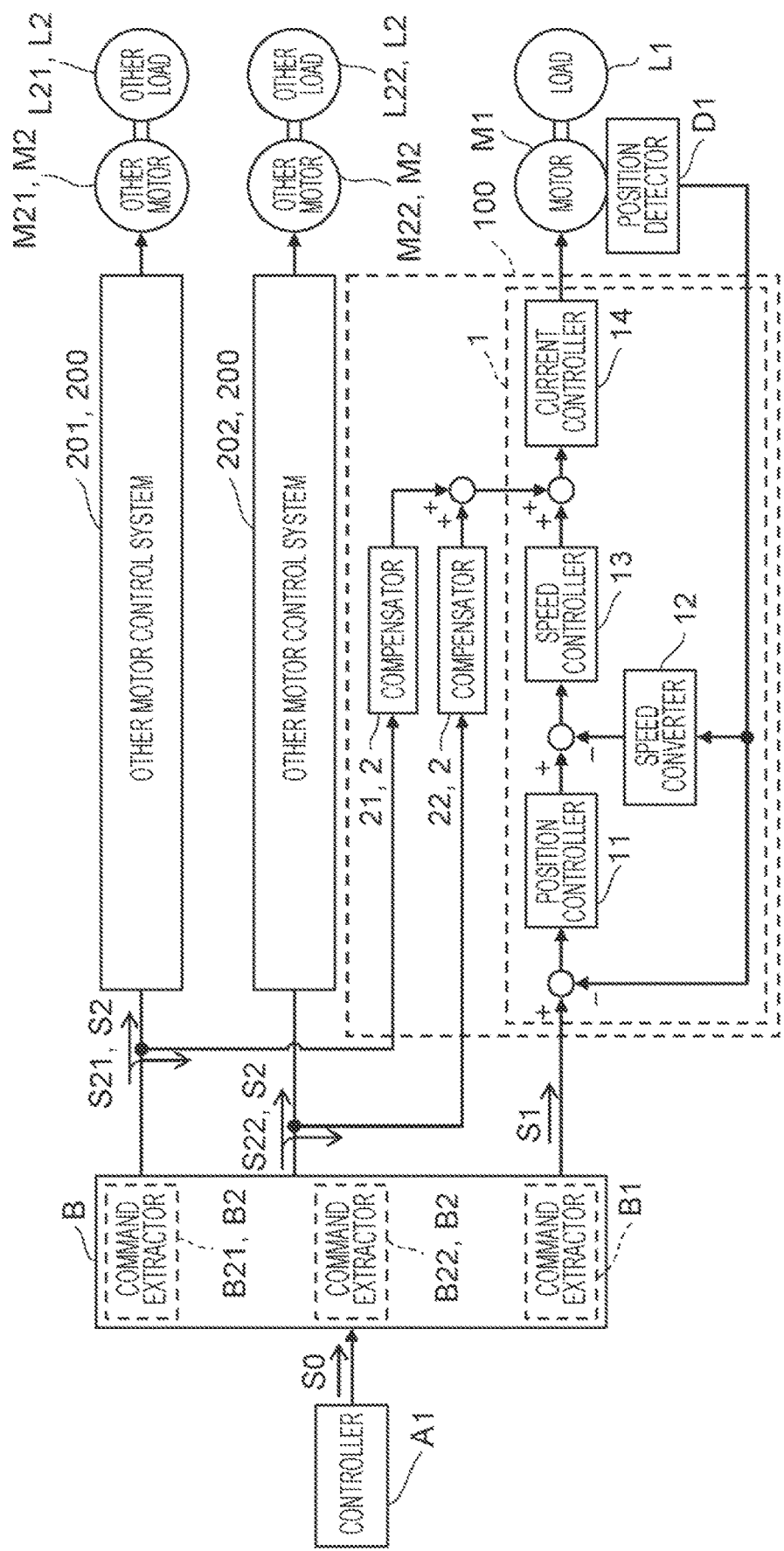
FIG. 17 is a block diagram illustrating an outline of the motor control system according to the fifth modification of the exemplary embodiment of the present disclosure.

FIG. 17 is a block diagram illustrating an outline of a motor control system according to the fifth modification of the exemplary embodiment of the present disclosure. Other motor M21 and other load L21, which are control targets CT21, are controlled by other motor control system 201 illustrated in FIG. 17. Similarly, other motor M22 and other load L22, which are control targets CT22, are controlled by other motor control system 202 illustrated in FIG. 17. As illustrated in FIG. 17, controller A1 outputs command signal S0 including operation commands S1, S21, S22 to command extractor B via a wired network or a wireless network. Command extractor B outputs operation commands S1, S21, S22 based on command signal S0. Note that command extractor B outputs operation command S21 to other motor control system 201, and outputs operation command S22 to other motor control system 202. Further, command extractor B outputs operation command S1 to motor control system 100. Other motor control systems 201, 202 receive operation commands S21, S22 output from command extractor B, and control the operations of the shafts of other motors M21, M22, respectively.

Motor control system 100 includes two compensators 2. Operation command S21 for other motor control system 201 is input to first compensator 21 of two compensators 2. Operation command S22 for other motor control system 202 is input to second compensator 22 of two compensators 2.

Note that command extractor B includes command extractors B1, B21, B22. Command extractor B1 outputs operation command S1 to motor control system 100. Command extractor B21 outputs operation command S21 to other motor control system 201. Command extractor B22 outputs operation command S22 to other motor control system 202.

First compensator 21 calculates a first compensation torque command based on input operation command S21 to output it. Similarly, second compensator 22 calculates a second compensation torque command based on input operation command S22 to output it. Accordingly, compensator 2 outputs a compensation torque command that is a sum of the first compensation torque command and the second compensation torque command to control unit 1.

Note that in the present modification, the sum of the first compensation torque command and the second compensation torque command is used as the compensation torque command, but each of the first compensation torque command and the second compensation torque command may be output as the compensation torque command. In this case, control unit 1 calculates the sum of the first compensation torque command, the second compensation torque command, and the torque command.

As described above, in the present modification, the plurality of other motors M2 are provided. Compensators 2 calculate compensation information (compensation torque commands) based on other-shaft information (operation commands S21, S22) of the plurality of other motors M2. Therefore, even when the disturbance torques caused by the reactions to the operations of the plurality of other motors M2 act on motor M1 and load L1, vibrations caused by the disturbance torques can be reduced.

Note that in the present modification, a number of control targets CT2 in other motor control systems 200 is two, but may be three or more. In this case, motor control system 100 may include three or more compensators 2 corresponding to three or more control targets CT2. That is, a number of compensators 2 is equal to a number of other motors M2.

(4.6) Sixth Modification

Figure 18:
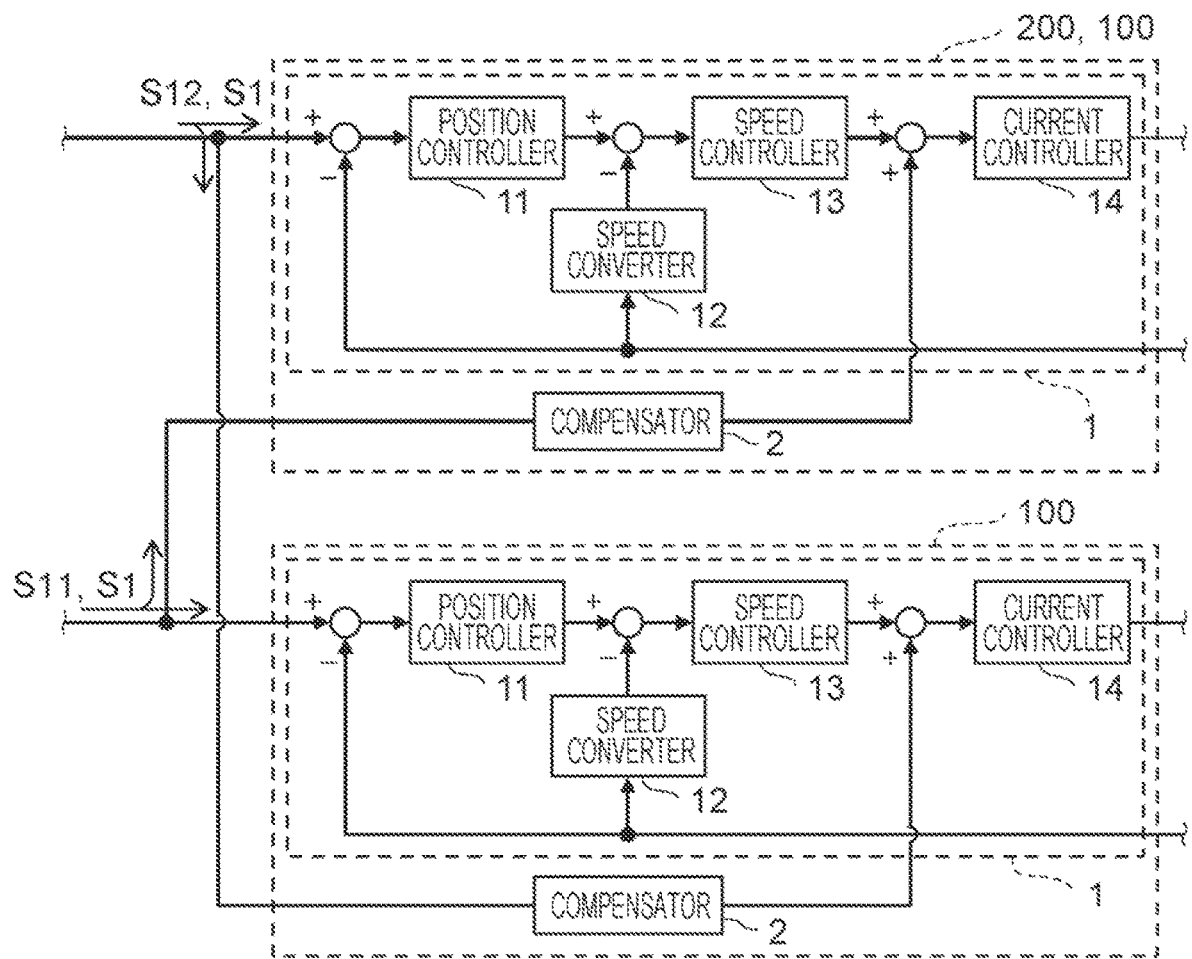
FIG. 18 is a block diagram illustrating an outline of a motor control system according to a sixth modification of the exemplary embodiment of the present disclosure.

FIG. 18 is a block diagram illustrating an outline of motor control system 100 according to a sixth modification of the exemplary embodiment of the present disclosure. As illustrated in FIG. 18, motor control system 100 according to the sixth modification is different from that in the exemplary embodiment in that other motor control system 200 includes compensator 2. That is, in the present modification, other motor control system 200 corresponds to motor control system 100. In one motor control system 100, compensator 2 calculates a compensation torque command based on operation command S12 for other motor control system 100 (other motor control system 200) and outputs the compensation torque command to control unit 1. Similarly, in other motor control system 100, compensator 2 calculates a compensation torque command based on operation command S11 for one motor control system 100 and outputs the compensation torque command to control unit 1.

In such a manner, compensators 2 of two motor control systems 100 each calculate the compensation information (compensation torque command) using operation command S1 for motor control system 100 as a counterpart. Therefore, in the present modification, a vibration caused by disturbance torque can be reduced in both of two motor control systems 100.

(4.7) Seventh Modification

Figure 19:
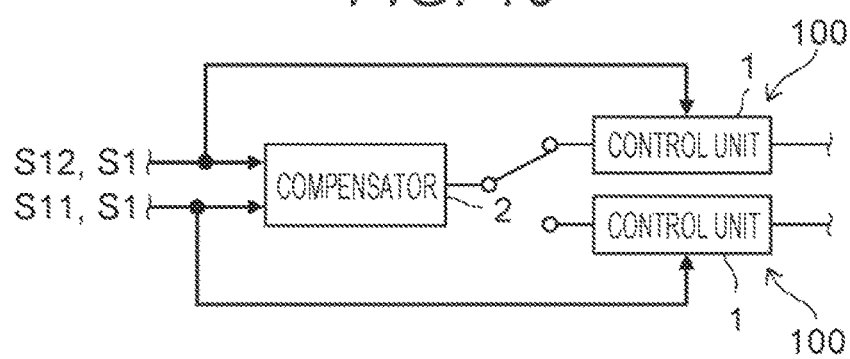
FIG. 19 is a block diagram illustrating an outline of a motor control system according to a seventh modification of the exemplary embodiment of the present disclosure.

FIG. 19 is a block diagram illustrating an outline of a motor control system according to a seventh modification of the exemplary embodiment of the present disclosure. As illustrated in FIG. 19, motor control system 100 according to the seventh modification is different from that in the sixth modification in that compensator 2 is shared by a plurality of (here, two) motor control systems 100. That is, each of two motor control systems 100 includes control unit 1. Both operation commands S11, S12 for two motor control systems 100, respectively, are input to compensator 2. Compensator 2 is configured to be connectable to any one of one control unit 1 and other control unit 1.

When operation command S11 is given to one motor control system 100, compensator 2 calculates compensation information (a compensation torque command) based on operation command S11, and outputs the calculated compensation information to control unit 1 of other motor control system 100. Similarly, when operation command S12 is given to other motor control system 100, compensator 2 calculates compensation information based on operation command S12, and outputs the calculated compensation information to control unit 1 of one motor control system 100.

In this manner, one compensator 2 is shared by two motor control systems 100. As a result, as in the sixth modification, a vibration caused by a disturbance torque can be reduced in both of two motor control systems 100.

(4.8) Other Modifications

Hereinafter, modifications other than the first to seventh modifications described above will be described. The modifications described below can be appropriately combined and applied.

In the above exemplary embodiment, load L1 connected to the shaft of motor M1 may be appropriately changed according to an application of motor M1. In this case, it is preferable that compensator 2 can set a parameter used to calculate compensation information (here, a compensation torque command) in accordance with load L1 connected to the shaft of motor M1.

In the above exemplary embodiment, torque estimator 3 illustrated in FIG. 1 estimates the disturbance torque using the position command as operation command S2 for other motor M2. However, the present disclosure is not limited thereto, and the disturbance torque may be estimated by using, for example, a speed command or an acceleration command. In these aspects, in the calculation processing for estimating the disturbance torque, a number of differential calculations necessary for estimating the disturbance torque can be reduced. This can reduce a calculation load.

In the exemplary embodiment, torque estimator 3 may estimate the disturbance torque using an operation amount (position, speed, or acceleration of another shaft) of another shaft of other motor M2 instead of operation command S2 (position command, speed command, or acceleration command) for other motor M2. In this aspect, since the disturbance torque is estimated by using the actual operation amount of other motor M2, low-pass filter processing is unnecessary in the calculation processing for estimating the disturbance torque. Further, this aspect has an advantage such that the disturbance torque is more easily estimated as compared with the case of estimating the disturbance torque using operation command S2.

In the exemplary embodiment, motor control system 100 adds the compensation torque command to the torque command to control the operation of the shaft of motor M1. However, the present disclosure is not limited to this aspect. For example, motor control system 100 may add, based on operation command S2 for other motor M2, a compensation position command or a compensation speed command for offsetting the vibration caused by the disturbance torque to the position command or the speed command for motor M1 to control the operation of the shaft of motor M1. That is, the compensation information is not limited to the compensation torque command.

(Summary)

As described above, motor control system 100 according to a first aspect includes control unit 1 and compensator 2. Control unit 1 controls the operation of the shaft of motor M1 in accordance with operation command S1 for motor M1. Compensator 2 calculates compensation information based on other-shaft information (operation command S2) about the operation of the other shaft of other motor M2 different from motor M1. The compensation information is information for compensating for an influence of the operation of the other shaft upon the shaft. Control unit 1 controls the operation of the shaft using the compensation information calculated by compensator 2.

This aspect provides an advantage such that a vibration caused by the operation of other motor M2 can be easily reduced.

In motor control system 100 according to a second aspect, in the first aspect, compensator 2 includes torque estimator 3 and compensation torque calculator 4. Torque estimator 3 estimates, based on the other-shaft information, the disturbance torque acting on motor M1 in accordance with the operation of the other shaft. Compensation torque calculator 4 calculates the compensation torque command based on the disturbance torque, and outputs the compensation torque command as the compensation information. The compensation torque command is a command for reducing the vibration caused by the disturbance torque acting on at least one of motor M1 and load L1 connected to the shaft of motor M1.

This aspect provides an advantage such that the disturbance torque due to the reaction to the operation of other motor M2 can be offset by the torque generated by the compensation torque command, and thus a vibration can be easily reduced.

In motor control system 100 according to a third aspect, in the second aspect, compensation torque calculator 4 executes the filter processing on the disturbance torque based on the transfer function (third transfer function "$G_3(s)$") to calculate the compensation torque command. In the transfer function, the motor torque acting on motor M1 is an input and load torque acting on load L1 is an output.

This aspect provides an advantage such that the disturbance torque due to the reaction to the operation of other motor M2 can be offset by the torque generated by the compensation torque command, and thus a vibration can be easily reduced.

In motor control system 100 according to a fourth aspect, in the third aspect, the filter processing is processing based on the product of the transfer function (first transfer function "$G_1(s)$") and the inverse function of the transfer function (second transfer function "$G_2(s)$"). In the first transfer function, the motor torque is an input, and the motor speed of the motor is an output. In the second transfer function, the load torque is an input and the motor speed is an output.

This aspect provides an advantage such that the disturbance torque due to the reaction to the operation of other motor M2 can be offset by the torque generated by the compensation torque command and thus a vibration can be easily reduced.

In motor control system 100 according to a fifth aspect, in the third aspect, the filter processing is processing based on the transfer function of the first-order low-pass filter.

This aspect provides an advantage such that the calculation load of the filter processing in compensator 2 is easily reduced.

In motor control system 100 according to a sixth aspect, in the third aspect, the filter processing is processing based on the product of the transfer function (fifth transfer function "$G_5(s)$"), the transfer function (fourth transfer function "$G_4(s)$"), and the transfer function of the first-order low-pass filter. In the fifth transfer function, the load torque is an input and the load speed of the load is an output. In the fourth transfer function, the motor torque is an input, and the load speed is an output.

This aspect provides an advantage such that the disturbance torque due to the reaction to the operation of other motor M2 can be offset by the torque generated by the compensation torque command and thus a vibration can be easily reduced.

In motor control system 100 according to a seventh aspect, in the fifth aspect, the cutoff frequency of the first-order low-pass filter is higher than or equal to an anti-resonance frequency of the frequency characteristic of the transfer function (sixth transfer function "$G_6(s)$") in which the load torque is an input and the motor torque is an output.

This aspect provides an advantage such that the disturbance torque due to the reaction to the operation of other motor M2 can be offset by the torque generated by the compensation torque command and thus a vibration can be easily reduced.

In motor control system 100 according to an eighth aspect, in the fifth aspect, the filter processing is processing based on the transfer function of the first-order high-pass filter.

This aspect provides an advantage such that a calculation load of the filter processing in compensator 2 is easily reduced.

In motor control system 100 according to a ninth aspect, in any one of the second to eighth aspects, compensation torque calculator 4 includes phase compensator 42 that compensates a phase difference between the torque instructed by the compensation torque command and the disturbance torque.

This aspect provides an advantage such that the phase difference between the disturbance torque and the torque generated by the compensation torque command is less likely to occur and thus the vibration caused by the disturbance torque is easily reduced.

In motor control system 100 according to a tenth aspect, in the ninth aspect, phase compensator 42 includes a first-order filter.

This aspect provides an advantage such that the phase difference between the disturbance torque and the torque generated by the compensation torque command is less likely to occur and thus the vibration caused by the disturbance torque is easily reduced.

In motor control system 100 according to an eleventh aspect, in any one of the second to tenth aspects, compensator 2 further includes deviation compensator 43. Deviation compensator 43 compensates a deviation generated in motor M1 when the disturbance torque acts on motor M1 bypassing load L1, based on the disturbance torque.

This aspect provides an advantage such that the impulse type deviation caused by the disturbance torque directly acting on motor M1 is easily reduced.

In motor control system 100 according to a twelfth aspect, in any one of the first to eleventh aspects, other motor M2 includes a plurality of other motors. Compensator 2 calculates the compensation information based on the other-shaft information of each of the plurality of other motors M2.

This aspect provides an advantage such that even when a disturbance torque due to the reactions to the operations of the plurality of other motors M2 act on motor M1 and load L1, the vibration caused by the disturbance torque is easily reduced.

In motor control system 100 according to a thirteenth aspect, in any one of the first to twelfth aspects, compensator 2 can set a parameter used to calculate the compensation information in accordance with load L1 connected to the shaft of motor M1.

This aspect provides an advantage such that the vibration caused by the disturbance torque can be appropriately reduced in accordance with an application of motor M1.

A motor control method according to a fourteenth aspect includes a control step and a compensation step. The control step is a step of controlling the operation of the shaft of motor M1 in accordance with operation command S1 for motor M1. The compensation step is a step of calculating the compensation information based on the other-shaft information (operation command S2) about the operation of the other shaft of other motor M2 different from motor M1. The compensation information is information for compensating for an influence of the operation of the other shaft upon the shaft. In the control step, the operation of the shaft is controlled by using the compensation information calculated in the compensation step.

This aspect provides an advantage such that the vibration caused by the operation of other motor M2 can be easily reduced.

A program according to a fifteenth aspect causes one or more processors to execute the motor control method according to the fourteenth aspect.

This aspect provides an advantage such that the vibration caused by the operation of other motor M2 can be easily reduced.

The configurations according to the second to thirteenth aspects are not essential to motor control system 100 and can be omitted as appropriate.

The invention claimed is:

1. A motor control system comprising:
   a control unit configured to control an operation of a shaft included in a motor in accordance with an operation command for the motor; and
   a compensator configured to calculate, based on other-shaft information about an operation of another shaft of another motor different from the motor, compensation information being for compensating an influence of the operation of the other shaft upon the shaft, wherein the control unit controls the operation of the shaft using the compensation information calculated by the compensator,
   wherein the compensator includes:
     a torque estimator configured to estimate, based on the other-shaft information, a disturbance torque acting on the motor in association with the operation of the other shaft; and
     a compensation torque calculator configured to calculate, based on the disturbance torque, a compensation torque command for reducing a vibration caused by the disturbance torque acting on at least one of the motor and a load connected to the shaft of the motor, and outputs the compensation torque command as the compensation information.

2. The motor control system according to claim 1, wherein the compensation torque calculator executes, based on a transfer function in which a motor torque acting on the motor is an input and a load torque acting on the load is an output, filter processing on the disturbance torque to calculate the compensation torque command.

3. The motor control system according to claim 2, wherein the filter processing is processing based on a product of a transfer function in which the motor torque is an input and a motor speed of the motor is an output, and an inverse function of a transfer function in which the load torque is an input and the motor speed is an output.

4. The motor control system according to claim 2, wherein the filter processing is processing based on a transfer function of a first-order low-pass filter.

5. The motor control system according to claim 4, wherein the first-order low-pass filter has a cutoff frequency higher than or equal to an anti-resonance frequency of a frequency characteristic of a transfer function in which the load torque is an input and the motor torque is an output.

6. The motor control system according to claim 2, wherein the filter processing is processing based on a product of a transfer function in which the load torque is an input and a load speed of the load is an output, an inverse function of a transfer function in which the motor torque is an input and the load speed is an output, and a transfer function of a first-order low-pass filter.

7. The motor control system according to claim 2, wherein the filter processing is processing based on a transfer function of a first-order high-pass filter.

8. The motor control system according to claim 1, wherein the compensation torque calculator includes a phase compensator that compensates a phase difference between a torque instructed by the compensation torque command and the disturbance torque.

9. The motor control system according to claim 8, wherein the phase compensator includes a first-order filter.

10. The motor control system according to claim 1, wherein the compensator further includes a deviation compensator that compensates, based on the disturbance torque, a deviation generated in the motor when the disturbance torque acts on the motor bypassing the load.

11. The motor control system according to claim 1, wherein the compensator is allowed to set a parameter used to calculate the compensation information in accordance with the load connected to the shaft of the motor.

12. A motor control system comprising:
a control unit configured to control an operation of a shaft included in a motor in accordance with an operation command for the motor; and
a compensator configured to calculate, based on other-shaft information about an operation of another shaft of another motor different from the motor, compensation information being for compensating an influence of the operation of the other shaft upon the shaft, wherein the control unit controls the operation of the shaft using the compensation information calculated by the compensator, wherein:
the other motor includes a plurality of the other motors, and the compensator calculates the compensation information based on the other-shaft information about each of the plurality of the other motors.

13. A motor control method comprising:
a control step of controlling an operation of a shaft of a motor in accordance with an operation command for the motor; and
a compensation step of calculating, based on other-shaft information about an operation of another shaft of another motor different from the motor, compensation information for compensating an influence of the operation of the other shaft upon the shaft, wherein in the control step, the operation of the shaft is controlled by using the compensation information calculated in the compensation step,
wherein the compensation step comprises:
estimating, based on the other-shaft information, a disturbance torque acting on the motor in association with the operation of the other shaft; and
calculating, based on the disturbance torque, a compensation torque command for reducing a vibration caused by the disturbance torque acting on at least one of the motor and a load connected to the shaft of the motor, and outputs the compensation torque command as the compensation information.

14. A program for causing one or more processors to execute the motor control method according to claim 13.

15. The motor control method according to claim 13, wherein the compensation step further includes compensating, based on the disturbance torque, a deviation generated in the motor when the disturbance torque acts on the motor bypassing the load.

16. The motor control method according to claim 13, wherein:
the other motor includes a plurality of the other motors, and
the compensation step includes calculating the compensation information based on the other-shaft information about each of the plurality of the other motors.

* * * * *